US009921808B1

(12) United States Patent
Swartzlander et al.

(10) Patent No.: US 9,921,808 B1
(45) Date of Patent: Mar. 20, 2018

(54) MEMRISTOR-BASED ADDERS USING MEMRISTORS-AS-DRIVERS (MAD) GATES

(71) Applicant: Board of Regents, The University of Texas System, Austin, TX (US)

(72) Inventors: Earl Swartzlander, Austin, TX (US); Lauren Guckert, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/612,942

(22) Filed: Jun. 2, 2017

(51) Int. Cl.
G06F 7/501 (2006.01)
G06F 7/505 (2006.01)
G06F 7/507 (2006.01)

(52) U.S. Cl.
CPC .............. G06F 7/501 (2013.01); G06F 7/505 (2013.01); G06F 7/507 (2013.01)

(58) Field of Classification Search
CPC ...................... G06F 7/485; G06F 7/50–7/508
USPC ..................................................... 70/707, 714
See application file for complete search history.

(56) References Cited

U.S. PATENT DOCUMENTS

| 8,773,167 | B2* | 7/2014 | Robinett | G11C 13/0007 326/104 |
| 2012/0014169 | A1 | 1/2012 | Snider | |
| 2013/0311413 | A1 | 11/2013 | Rose et al. | |
| 2014/0028347 | A1* | 1/2014 | Robinett | G11C 13/0007 326/38 |
| 2015/0256178 | A1 | 9/2015 | Kvatinsky et al. | |
| 2016/0020766 | A1 | 1/2016 | Miao et al. | |
| 2016/0189772 | A1 | 6/2016 | Mohammad et al. | |
| 2017/0337968 | A1 | 11/2017 | Jagtap | |

FOREIGN PATENT DOCUMENTS

WO  WO 2017144862 A1 *  8/2017  ......... G11C 13/0007

OTHER PUBLICATIONS

Bickerstaff et al., "Memristor-based Arithmetic," Conference Record of the 44th Asilomar Conference on Signals, Systems and Computers (ASILOMAR), Pacific Grove, CA, United States, Nov. 7-10, 2010, pp. 1173-1177.

Kvatinsky et al., "Memristor-Based Material Implication (IMPLY) Logic: Design Principles and Methodologies," IEEE Transactions on Very Large Scale Integration (VLSI) Systems, vol. 22, Issue 10, Oct. 2014, pp. 2054-2066.

(Continued)

Primary Examiner — Matthew Sandifer
(74) Attorney, Agent, or Firm — Robert A. Voigt, Jr.; Winstead, P.C.

(57) ABSTRACT

Memristor-based adders using memristors-as-drivers (MAD) gates. As a result of employing MAD gates in memristor-based adders, such as ripple carry adders, carry select adders, conditional sum adders and carry lookahead adders, the number of delay steps may be less than half than the number of delay steps required in traditional CMOS implementations of adders. Furthermore, by using MAD gates, memristor-based adders can be implemented with less complexity (e.g., fewer memristors and drivers). As a result, by the memristor-based adders using MAD gates, the speed and complexity of a wide variety of arithmetic operations is improved.

10 Claims, 17 Drawing Sheets

(56) References Cited

OTHER PUBLICATIONS

Kvatinsky et al., "MAGIC—Memristor Aided LoGIC," IEEE Transactions on Circuits and Systems II: Express Briefs, vol. 61, Issue 11, Nov. 2014, pp. 895-899.
Mahajan et al., "Memristor Based Adders," Conference Record of the 48th Asilomar Conference on Signals, Systems and Computers, Pacific Grove, United States, Nov. 2-5, 2014, pp. 1256-1260.
Lauren C. Guckert, Memristor-Based Arithmetic Units, Ph.D. Defense, Oct. 28, 2016, pp. 1-166.
Kvatinsky et al., "MRL—Memristor Ratioed Logic," 13th International Workshop on Cellular Nanoscale Networks and Their Applications (CNNA), Aug. 29-31, 2012, pp. 1-6.
Teimoory et al., "Optimized Implementation of Memristor-Based Full Adder by Material Implication Logic," 21st IEEE International Conference on Electronics, Circuits and Systems (ICECS), Marseille, France, 2014, pp. 1-4.
Zhang et al., A Novel Design for Memristor-Based Logic Switch and Crossbar Circuits, IEEE Transactions on Circuits end Systems-I: Regular Papers, vol. 62, No. 5, May 2015, pp. 1402-1411.
Zhang et al., "A Novel Design for a Memristor-Based OR Gate," IEEE Transactions on Circuits and Systems-II: Express Briefs, vol. 62, No. 8, Aug. 2015, pp. 781-785.
Guckert et al., "MAD Gates—Memristor Logic Design Using Driver Circuitry," IEEE Transactions on Circuits and Systems II: Express Briefs, vol. PP, No. 99, Apr. 7, 2016, pp. 1-5.
Lauren Elise Guckert, "Memristor-Based Arithmetic Units," Dissertation Presented to the Faculty of the Graduate School of The University of Texas at Austin, Dec. 2016, pp. 1-255, see pp. 45-115.
Guckert et al., "MAD Gates—Memristor Logic Design Using Driver Circuitry," IEEE Transactions on Circuits and Systems II: Express Briefs, vol. 64, No. 2, Feb. 2017, pp. 1-5.
Guckert et al., "Optimized Memristor-Based Ripple Carry Adders," Asilomar Conference on Signals, Systems and Computers, Pacific Grove, California, United States of America, Nov. 8, 2016, pp. 1-5.
Swartzlander et al., U.S. Patent Application entitled "Memristor Logic Design Using Driver Circuitry," filed Dec. 5, 2016, assigned U.S. Appl. No. 15/369,364.
Office Action for U.S. Appl. No. 15/369,364 dated Jan. 25, 2018, pp. 1-19.

\* cited by examiner

MEMRISTOR-BASED ADDERS USING MEMRISTORS-AS-DRIVERS (MAD) GATES

TECHNICAL FIELD

The present invention relates generally to memristors, and more particularly to memristor-based adders using memristors-as-drivers (MAD) gates to improve the speed and complexity of arithmetic operations.

BACKGROUND

Memristors were first hypothesized by Leon Chua in 1971, and since then research has explored the potential for these devices in modern system design. The most direct benefits of memristors, low area and high density, lend themselves to improved memory design, sparking the majority of prior research. Only recently has research begun to explore the use of memristors in arithmetic applications. The work that has been done has focused on individual logic gates and small circuits. There have been numerous approaches to this endeavor: IMPLY operations, MAGIC gates, logic-in-memory, hybrid-CMOS gates, and threshold gates, to name the most prevalent.

Unfortunately, each prior approach to memristor-based logic has shortcomings. IMPLY gates are serialized and incur high delays for Boolean operations. Hybrid-CMOS gates suffer from signal degradation. MAGIC gates and logic-in-memory designs are limited in applications since they cannot be concatenated or provide multiple fanout. Threshold gates using GOTO pairs, although low in area and delay, are still in their infant stages in terms of fabrication.

Hence, all prior designs for memristor-based gates have had shortcomings in terms of scalability, applicability, completeness and performance. For example, adders using memristor-based gates have shortcomings in terms of delay and complexity (many transistors, memristors, switches, drivers and/or resistors).

SUMMARY

In one embodiment of the present invention, a ripple carry adder comprises a first memristor, where the first memristor is connected to a first switch and a second switch. The ripple carry adder further comprises a second memristor connected in parallel to the first memristor, where the second memristor is connected to a third switch, where a fourth switch is connected to the first and second memristors. The ripple carry adder additionally comprises a third memristor connected in parallel to the second memristor, where the third memristor is connected to a fifth switch. Furthermore, the ripple carry adder comprises a fourth memristor connected in parallel to the third memristor, where the fourth memristor is connected to a sixth switch. Additionally, the ripple carry adder comprises a fifth memristor connected in parallel to the fourth memristor, where the fifth memristor is connected to a seventh and an eighth switch, and where the seventh and eighth switches are connected in series. In addition, the ripple carry adder comprises a sixth memristor connected in parallel to the fifth memristor, where the sixth memristor is connected to a ninth and a tenth switch, and where the ninth and tenth switches are connected in parallel. The ripple carry adder further comprises a seventh memristor connected in parallel to the sixth memristor, where the seventh memristor is connected to a first power source. The ripple carry adder additionally comprises an eighth memristor connected in parallel to the seventh memristor, where the eighth memristor is connected to the first power source.

In another embodiment of the present invention, a ripple carry adder comprises a first memristor connected to a first power source, where the first memristor is connected to a first switch and a second switch. The ripple carry adder further comprises a second memristor connected in parallel to the first memristor, where the second memristor is connected to a third switch, where a second power source is connected to the third switch, and where a fourth switch is connected to the first and second memristors. The ripple carry adder additionally comprises a third memristor connected in parallel to the second memristor, where the third memristor is connected to a fifth switch, a sixth switch and a seventh switch, where the sixth and seventh switches are connected in series, and where the sixth and seventh switches are connected in parallel to the fifth switch. Furthermore, the ripple carry adder comprises a fourth memristor connected in parallel to the third memristor, where the fourth memristor is connected to an eighth switch, a ninth switch, a tenth switch, an eleventh switch, a twelfth switch and a thirteenth switch, where the eighth, ninth and tenth switches are connected in series, where the eleventh and twelfth switches are connected in parallel, where a combination of the eleventh and twelfth switches is connected in series with the thirteenth switch, and where a combination of the eighth, ninth and tenth switches is connected in parallel to a combination of the eleventh, twelfth and thirteenth switches.

In a further embodiment of the present invention, a carry select adder comprises a first memristor connected to a first power source, where the first memristor is connected to a first switch and a second switch. The carry select adder further comprises a second memristor connected in parallel to the first memristor, where the second memristor is connected to a third switch, where a second power source is connected to the third switch, and where a fourth switch is connected to the first and second memristors. The carry select adder additionally comprises a third memristor connected in parallel to the second memristor, where the third memristor is connected to a fifth switch, a sixth switch and a seventh switch, where the sixth and seventh switches are connected in series, and where the sixth and seventh switches are connected in parallel to the fifth switch. Furthermore, the carry select adder comprises a fourth memristor connected in parallel to the third memristor, where the fourth memristor is connected to an eighth switch, a ninth switch, a tenth switch, an eleventh switch, a twelfth switch and a thirteenth switch, where the eighth, ninth and tenth switches are connected in series, where the eleventh and twelfth switches are connected in parallel, where a combination of the eleventh and twelfth switches is connected in series with the thirteenth switch, and where a combination of the eighth, ninth and tenth switches is connected in parallel to a combination of the eleventh, twelfth and thirteenth switches. Additionally, the carry select adder comprises a fifth memristor connected in parallel to the fourth memristor, where the fifth memristor is connected to a fourteenth switch, a fifteenth switch and a sixteenth switch, where the fifteenth and sixteenth switches are connected in series, and where the fifteenth and sixteenth switches are connected in parallel to the fourteenth switch. In addition, the carry select adder comprises a sixth memristor connected in parallel to the fifth memristor, where the sixth memristor is connected to a seventeenth switch, an eighteenth switch, a nineteenth switch, a twentieth switch, a twenty-first switch and a twenty-second switch, where the seventeenth, eighteenth and nineteenth switches are connected in series, where the twentieth and twenty-first switches are connected in parallel, where a combination of the twentieth and twenty-first switches is connected in series with the twenty-second switch, and where a combination of the seventeenth, eighteenth and nineteenth switches is connected in parallel to a combination of the twentieth, twenty-first and twenty-second switches.

In another embodiment of the present invention, a half adder for even bits in a conditional sum adder comprises a first memristor connected to a first power source, where the first memristor is connected to a first switch and a second switch. The half adder further comprises a second memristor connected in parallel to the first memristor, where the second memristor is connected to a third switch, where a second power source is connected to the third switch, and where a fourth switch is connected to the first and second memristors. The half adder additionally comprises a third memristor connected in parallel to the second memristor, where the third memristor is connected to a fifth switch. Furthermore, the half adder comprises a fourth memristor connected in parallel to the third memristor, where the fourth memristor is connected to a sixth and a seventh switch, and where the sixth and seventh switches are connected in series. Additionally, the half adder comprises a fifth memristor connected in parallel to the fourth memristor, where the fifth memristor is connected to an eighth switch. In addition, the half adder comprises a sixth memristor connected in parallel to the fifth memristor, where the sixth memristor is connected to an ninth and a tenth switch, and where the ninth and tenth switches are connected in parallel.

In a further embodiment of the present invention, a carry lookahead adder comprises a first memristor, where the first memristor is connected to a first switch, a second switch, a third switch, a fourth switch, a fifth switch, a sixth switch, a seventh switch, an eighth switch, a ninth switch and a tenth switch, where the first, second, third and fourth switches are connected in series, where the fifth, sixth and seventh switches are connected in series, where the eighth and ninth switches are connected in series, and where a combination of the first, second, third and fourth switches is connected in parallel to a combination of the fifth, sixth and seventh switches which is connected in parallel to a combination of the eighth and ninth switches which is connected in parallel to the tenth switch. The carry lookahead adder further comprises a second memristor connected in parallel to the first memristor, where the second memristor is connected to an eleventh switch, a twelfth switch, a thirteenth switch, a fourteenth switch, a fifteenth switch and a sixteenth switch, where the eleventh, twelfth and thirteenth switches are connected in series, where the fourteenth and fifteenth switches are connected in series, and where a combination of the eleventh, twelfth and thirteenth switches is connected in parallel to a combination of the fourteenth and fifteenth switches which is connected in parallel to the sixteenth switch. Furthermore, the carry lookahead adder comprises a third memristor connected in parallel to the second memristor, where the third memristor is connected to a seventeenth switch, an eighteenth switch and a nineteenth switch, where the seventeenth and eighteenth switches are connected in series, and where a combination of the seventeenth and eighteenth switches is connected in parallel to the nineteenth switch.

In another embodiment of the present invention, a carry lookahead adder comprises a first memristor connected to a first power source, where the first memristor is connected to a first switch and a second switch. The carry lookahead adder further comprises a second memristor connected in parallel to the first memristor, where the second memristor is connected to a third switch, where a second power source is connected to the third switch, and where a fourth switch is connected to the first and second memristors. The carry lookahead adder additionally comprises a third memristor connected in parallel to the second memristor, where the third memristor is connected to a fifth switch. Furthermore, the carry lookahead adder comprises a fourth memristor connected in parallel to the first memristor, where the fourth memristor is connected to a sixth switch and a seventh switch, where the fourth memristor is connected to the first power source, and where an eighth switch is connected to the third and fourth memristors. Additionally, the carry lookahead adder comprises a fifth memristor connected in parallel to the third memristor, where the fifth memristor is connected to a ninth switch. In addition, the carry lookahead adder comprises a sixth memristor connected in parallel to the fourth memristor, where the sixth memristor is connected to a tenth switch and an eleventh switch, where the sixth memristor is connected to the first power source, and where a twelfth switch is connected to the fifth and sixth memristors. The carry lookahead adder further comprises a seventh memristor connected in parallel to the fifth memristor, where the seventh memristor is connected to a thirteenth switch. The carry lookahead adder additionally comprises an eighth memristor connected in parallel to the sixth memristor, where the eighth memristor is connected to a fourteenth switch and a fifteenth switch, where the eighth memristor is connected to the first power source, and where a sixteenth switch is connected to the seventh and eighth memristors. Furthermore, the carry lookahead adder comprises a ninth memristor connected in parallel to the eighth memristor, where the ninth memristor is connected to a seventeenth switch, an eighteenth switch, a nineteenth switch and a twentieth switch, and where the seventeenth, eighteenth, nineteenth and twentieth switches are connected in series. Additionally, the carry lookahead adder comprises a tenth memristor connected in parallel to the ninth memristor, where the tenth memristor is connected to a twenty-first switch, a twenty-second switch, a twenty-third switch, a twenty-fourth switch, a twenty-fifth switch, a twenty-sixth switch, a twenty-seventh switch, a twenty-eighth switch, a twenty-ninth switch and a thirtieth switch, where the twenty-first, twenty-second, twenty-third and twenty-fourth switches are connected in series, where the twenty-fifth, twenty-sixth and twenty-seventh switches are connected in series, where the twenty-eighth and twenty-ninth switches are connected in series, where a combination of the twenty-first, twenty-second, twenty-third and twenty-fourth switches are connected in parallel to a combination of the twenty-fifth, twenty-sixth and twenty-seventh switches, where the combination of the twenty-fifth, twenty-sixth and twenty-seventh switches is connected in parallel to a combination of the twenty-eighth and twenty-ninth switches, and where the combination of the twenty-eighth and twenty-ninth switches is connected in parallel to the thirtieth switch.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, memristors have recently begun to be explored in arithmetic operations. However, all prior designs for memristor-based gates have had shortcomings in terms of scalability, applicability, completeness and performance. For example, adders using memristor-based gates have shortcomings in terms of delay and complexity (many transistors, memristors, switches, drivers and/or resistors).

The principles of the present invention provide a new lower-power gate design, Memristors-As-Drivers gates (hereinafter "MAD" gates), which overcomes each of these issues by combining sense circuitry with the IMPLY operation. By using such MAD gates, memristor-based adders can be implemented with less complexity (e.g., fewer memristors and drivers) and delay. A discussion regarding the various types of memristor-based adders using MAD gates, such as ripple carry adders, carry select adders, conditional sum adders and carry lookahead adders, is provided below.

Figure 1:
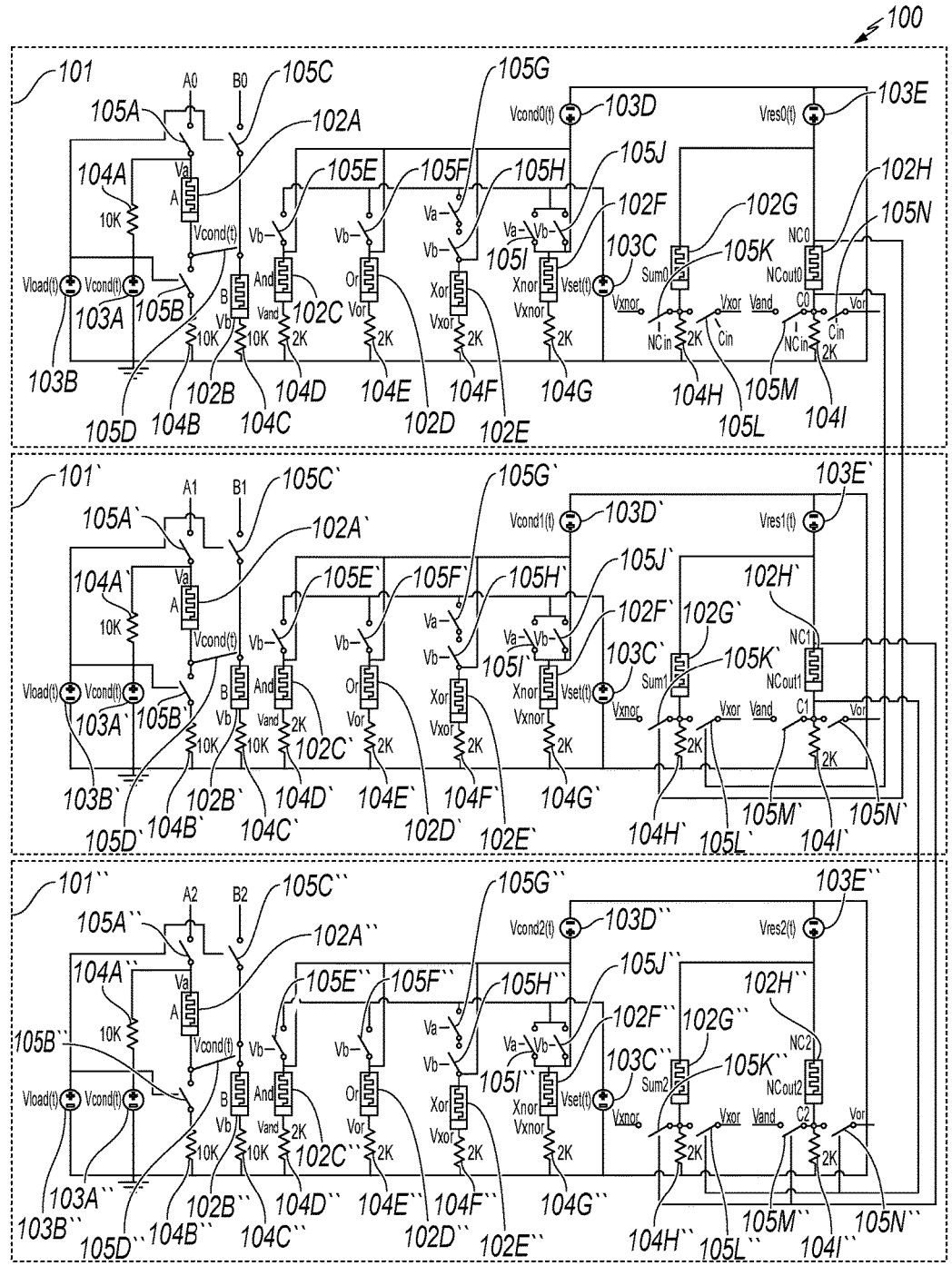
FIG. 1 illustrates a Memristors-As-Drivers (MAD) ripple carry adder in accordance with an embodiment of the present invention.

Referring now to the Figures in detail, FIG. 1 illustrates a MAD ripple carry adder 100 in accordance with an embodiment of the present invention.

In particular, FIG. 1 illustrates a 3-bit MAD ripple carry adder 100, but any adder width can be constructed by concatenating full adders in the same manner. The total complexity is 8N memristors, 9N resistors, 14N switches, and 2N+3 drivers, where N is the number of bits.

As shown in FIG. 1, in one embodiment, adder 100 includes circuitry 101 that includes memristors 102A, 102B connected in parallel. Memristor 102A is connected to power source 103A (Vcond(t)) via resistor 104A (value of 10K ohms in one embodiment). Memristor 102A is further connected to a switch 105A. Furthermore, memristor 102A is connected to switch 105B, which is connected to ground via resistor 104B (value of 10K ohms in one embodiment). Furthermore, switches 105A, 105B are connected to power source 103B (Vload(t)).

Memristor 102B is connected to ground via resistor 104C (value of 10K ohms in one embodiment). Furthermore, memristor 102B is connected to switch 105C which is connected to power source 103B (Vload(t)). Additionally, there is a switch 105D between memristors 102A, 102B which is driven by Vcond(t).

Memristor 102C is connected in parallel to memristor 102B. Furthermore, memristor 102C is connected to ground via resistor 104D (value of 2K ohms in one embodiment). Additionally, memristor 102C is connected to switch 105E, which is connected to power source 103C (Vset(t)). Furthermore, memristor 102C is connected to power source 103D (Vcond0(t)).

Memristor 102D is connected in parallel to memristor 102C. Furthermore, memristor 102D is connected to ground via resistor 104E (value of 2K ohms in one embodiment). Additionally, memristor 102D is connected to switch 105F, which is connected to power source 103C. Furthermore, memristor 102D is connected to power source 103D.

Memristor 102E is connected in parallel to memristor 102D. Furthermore, memristor 102E is connected to ground via resistor 104F (value of 2K ohms in one embodiment). Additionally, memristor 102E is connected to switches 105G, 105H, which are connected in series, where switch 105G is connected to power source 103C. Furthermore, memristor 102E is connected to power source 103D.

Memristor 102F is connected in parallel to memristor 102E. Furthermore, memristor 102F is connected to ground via resistor 104G (value of 2K ohms in one embodiment). Additionally, memristor 102F is connected to switches 105I, 105I, which are connected in parallel. Furthermore, switches 105I, 105J are connected to power source 103C. Additionally, memristor 102F is connected to power source 103D.

Memristor 102G is connected in parallel to memristor 102F. Furthermore, memristor 102G is connected to ground via resistor 104H (value of 2K ohms in one embodiment). Furthermore, Memristor 102G is connected to switches 105K, 105L as shown in FIG. 1.

Memristor 102H is connected in parallel to memristor 102G. Additionally, memristor 102H is connected to ground via resistor 104I (value of 2K ohms in one embodiment). Furthermore, Memristor 102H is connected to switches 105M, 105N as shown in FIG. 1.

Furthermore, memristors 102G, 102H are connected to power source 103E (Vres0(t)).

In one embodiment, the number of circuits 101 in ripple carry adder 100 is equal to the number of bits in the ripple carry adder. For example, since ripple carry adder 100 is a three-bit ripple carry adder, there are three circuits 101 (the other two are signified as 101' and 101" with the same circuit elements as in circuit 101 with the designation of ' and ", respectively), where such circuits 101, 101' and 101" are connected to each other as shown in FIG. 1.

In one embodiment, the load and intermediate operation steps can now be performed in parallel across the individual bits. At t=0, the $V_{load}$ driver for the input memristors is applied to each bit, loading the inputs $A_i$ and $B_i$ into their corresponding full adders. Then, all of the intermediate Boolean operations can be resolved by applying $V_{cond}$ and $V_{set}$ respectively. Lastly, each of the bits can resolve their sum and carry signals one step at a time. First, bit 0 resolves its sum and inverse carry-out. In the next cycle, the inverse carry-out memristor is applied a $V_{cond}$ signal so that the voltage at the n terminal represents the value of the carry-out signal and the voltage at the p terminal represents the inverse. These two voltage strengths drive the gates on the subsequent bit in the same way the carry-in bit did for the full adder. The process then repeats for the subsequent bits until the final sum and carry-out are resolved. An N-bit addition requires N+1 steps.

Figure 2:
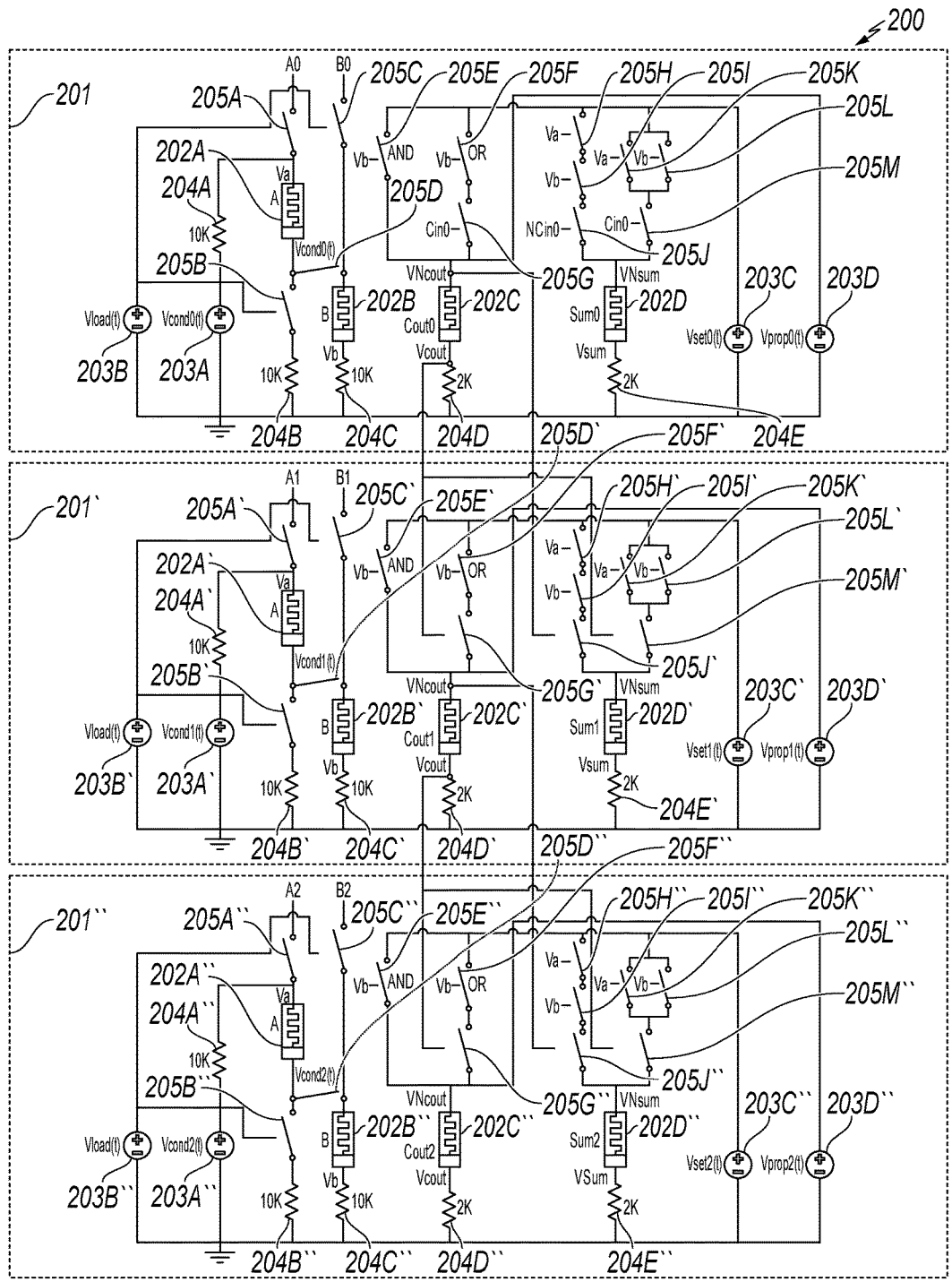
FIG. 2 illustrates an optimized N-bit ripple carry adder in accordance with an embodiment of the present invention.

In one embodiment, N-bit ripple carry adder 100 is implemented with the optimized MAD full adder resulting in N-bit ripple carry adder 200 as shown in FIG. 2 in accordance with an embodiment of the present invention.

As shown in FIG. 2, in one embodiment, adder 200 includes circuitry 201 that includes memristors 202A, 202B connected in parallel. Memristor 202A is connected to power source 203A (Vcond0(t)) via resistor 204A (value of 10K ohms in one embodiment). Memristor 202A is connected to a switch 205A. Furthermore, memristor 202A is connected to switch 205B, which is connected to ground via resistor 204B (value of 10K ohms in one embodiment). Furthermore, switches 205A, 205B are connected to power source 203B (Vload(t)).

Memristor 202B is connected to ground via resistor 204C (value of 10K ohms in one embodiment). Furthermore, memristor 202B is connected to switch 205C which is connected to power source 203B (Vload(t)). Additionally, there is a switch 205D between memristors 202A, 202B which is driven by Vcond0(t).

Memristor 202C is connected in parallel to memristor 202B. Furthermore, memristor 202C is connected to ground via resistor 204D (value of 2K ohms in one embodiment). Additionally, memristor 202C is connected to switches 205E, 205F, 205G, where switches 205F, 205G are connected in series and the combination of switches 205F, 205G is connected in parallel to switch 205E. Furthermore, switches 205E, 205F are connected to power source 203C (Vest0(t)). Additionally, memristor 202C is connected to power source 203D (Vprop0(t)).

Furthermore, memristor 202D is connected in parallel to memristor 202C. Memristor 202D is connected to ground via resistor 204E (value of 2K ohms in one embodiment). Furthermore, memristor 202D is connected to switches 205H, 205I, 205J, 205K, 205L, 205M, where switches 205K, 205L are connected in parallel and the combination of switches 205K, 205L is connected in series to switch 205M. Furthermore, the combination of switches 205K, 205L, 205M is connected in parallel to the combination of switches 205H, 205I, 205J, where switches 205H, 205I and 205J are connected in series. Furthermore, switches 205H, 205K, 205L are connected to power source 203C.

In one embodiment, the number of circuits 201 in ripple carry adder 200 is equal to the number of bits in the ripple carry adder. For example, since ripple carry adder 200 is a three-bit ripple carry adder, there are three circuits 201 (the other two are signified as 201' and 201" with the same circuit elements as in circuit 201 with the designation of ' and ", respectively), where such circuits 201, 201' and 201" are connected to each other as shown in FIG. 2.

In one embodiment, the $V_{load}$ driver in adder 200 loads the inputs Ai and Bi into every full adder's input memristors at t=0. Then, in the first step, bit 0 resolves its Carry-out and Sum memristor as done in the original MAD design. In the next step, $V_{prop2}$ applies a read signal, $V_{cond}$, to the $C_{out}$ memristor. Then, as done in the original design, the n terminal can be sensed to represent the inverse of the carry-out and the voltage at the p terminal can be sensed to represent the carry-out signal. These values are then used in the same manner as the first full adder to drive the respective carry in signals on the next adder. The process repeats through each bit of the adder, resolving the final carry-out and sum in the Nth step. This is one less step than the original MAD design.

The total complexity for the N-bit adder 200 is 4N memristors, 5N resistors, 13N switches, and 3N+1 drivers, where N is the number of bits. The number of drivers is fewer than the number of memristors because the $V_{load}$ driver has identical behavior for all bits and can be reused across them. The area and delay comparisons with the original MAD ripple carry adder (RCA) (FIG. 1) and the proposed MAD RCA (FIG. 2) are summarized in Table 1 shown below.

TABLE 1

Delay and complexity improvements for the proposed MAD RCA adder

|  | Original MAD RCA | Proposed MAD RCA |
|---|---|---|
| Complexity | 8N memristors | 4N memristors |
|  | 9N resistors | 5N resistors |
|  | 14N switches | 13N switches |
|  | 2N + 3 drivers | 3N + 1 drivers |
| Delay | N + 1 | N |

The proposed MAD design can further improve delay by pipelining independent additions, similar to the IMPLY approach. Since the computations on the bits are performed through the use of drivers, the bits can be logically separated. Thus, as soon as bit 0 has completed its portion of an addition and its carry out has been sensed by bit 1, it can begin a new addition in parallel with the remaining bits finishing the current addition. The overhead is 2 steps: 1 for sensing the result, and 1 for resetting the memristors. However, since each memristor in the adder is disjoint, the memristors can each be reset during other steps of the addition, reducing the overhead to a single step. Thus, every 4 cycles a new addition can begin. In traditional CMOS and the other approaches, additions cannot overlap and must wait for the previous addition to complete.

Another type of adder using the MAD implementation is the MAD carry select adder as discussed below in connection with FIG. 3.

Figure 3:
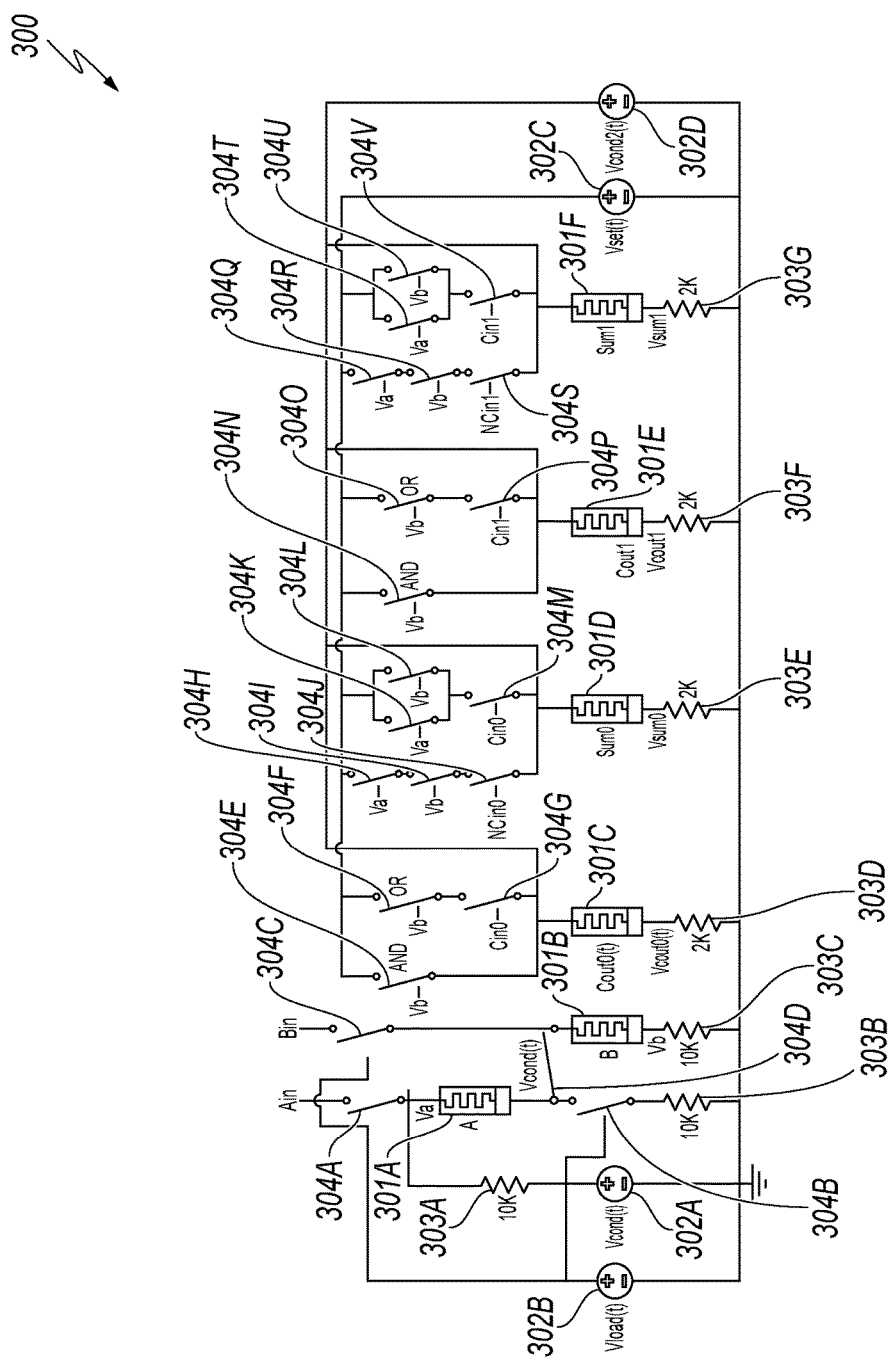
FIG. 3 illustrates a modified full adder for a MAD carry select adder in accordance with an embodiment of the present invention.

FIG. 3 illustrates a modified full adder for a MAD carry select adder 300 in accordance with an embodiment of the present invention.

MAD carry select adder 300 optimizes the delay and area for the MAD context. The k-bit adders take roughly the same form as the MAD ripple carry adder. The first k-bit block is identical to a standard MAD ripple carry adder since the carry-in signal is known at time=0. The remaining k-bit blocks have a slightly modified form. The properties of the MAD full adder can be leveraged to remove the need for the second adder in each adder block. The MAD full adder achieves its low delay by producing the intermediate results for the scenarios where the carry-in is 0 and 1. Thus, the information which spans two ripple carry adders in the traditional design is encapsulated naturally in a single adder in MAD gates. The only adaptation is that the final result memristor circuitry for the sum and carry-out memristors is duplicated. The first sum and carry-out memristor will be applied the carry-in according to the scenario where the carry-in to the block is 0 and the second sum and carry-out memristor will be applied the carry-in according to the carry-in to the block being 1. These additions can be performed in parallel independent from each other.

As shown in FIG. 3, MAD carry select adder 300 include memristors 301A, 301B connected in parallel. Memristor 301A is connected to power source 302A (Vcond0($t$)) via resistor 303A (value of 10K ohms in one embodiment). Memristor 301A is connected to a switch 304A. Furthermore, memristor 301A is connected to switch 304B, which is connected to ground via resistor 303B (value of 10K ohms in one embodiment). Additionally, switches 304A, 304B are connected to power source 302B (Vload(t)).

Memristor 301B is connected to ground via resistor 303C (value of 10K ohms in one embodiment). Furthermore, memristor 301B is connected to switch 304C which is connected to power source 302B (Vload(t)). Additionally, there is a switch 304D between memristors 301A, 301B which is driven by Vcond(t).

Memristor 301C is connected in parallel to memristor 301B. Memristor 301C is connected to ground via resistor 303D (value of 2K ohms in one embodiment). Furthermore, memristor 301C is connected to switches 304E, 304F, 304G, where switches 304F, 304G are connected in series and the combination of switches 304F, 304G is connected in parallel to switch 304E. Furthermore, switches 304E, 304F are connected to power source 302C (Vest(t)) and memristor 301C is connected to power source 302D (Vcond2($t$)).

Furthermore, memristor 301D is connected in parallel to memristor 301C. Memristor 301D is connected to ground via resistor 303E (value of 2K ohms in one embodiment). Additionally, memristor 301D is connected to switches 304H, 304I, 304J, 304K, 304L, 304M, where switches 304K, 304L are connected in parallel and the combination of switches 304K, 304L is connected in series to switch 304M. Furthermore, the combination of switches 304K, 304L, 304M is connected in parallel to the combination of switches 304H, 304I, 304J, where switches 304H, 304I and 304J are connected in series. Furthermore, switches 304H, 304K, 304L are connected to power source 302C. Additionally, memristor 301D is connected to power source 302D.

Memristor 301E is connected in parallel to memristor 301D. Memristor 301E is connected to ground via resistor 303F (value of 2K ohms in one embodiment). Furthermore, memristor 301E is connected to switches 304N, 304O, 304P, where switches 304O, 304P are connected in series and the combination of switches 304O, 304P is connected in parallel to switch 304N. Furthermore, switches 304N, 304O are connected to power source 302C and memristor 301E is connected to power source 302D.

Furthermore, memristor 301F is connected in parallel to memristor 301E. Memristor 301F is connected to ground via resistor 303G (value of 2K ohms in one embodiment). Additionally, memristor 301F is connected to switches 304Q, 304R, 304S, 304T, 304U, 304V, where switches 304T, 304U are connected in parallel and the combination of switches 304T, 304U is connected in series to switch 304V. Furthermore, the combination of switches 304T, 304U, 304V is connected in parallel to the combination of switches 304Q, 304R, 304S, where switches 304Q, 304R and 304S are connected in series. Furthermore, switches 304Q, 304T, 304U are connected to power source 302C. Additionally, memristor 301F is connected to power source 302D.

By replicating adder 300 k times and propagating both of the carry signals, each k-bit block will require k steps to produce the final two carry-out values. The propagation of the carry-bit between blocks will use the same logic as used internal to the k-bit blocks, requiring only a single delay. Thus, the total delay for an N-bit MAD carry select adder 300 is (k)+(N/k−2)+1 or k+N/k−1. Solving the derivative for k results in the same optimal value of k as in CMOS, $\sqrt{(N)}$. Thus, the total delay of an n-bit MAD carry select adder is $2\sqrt{(N)}-1$, less than half the CMOS delay of $4\sqrt{(N)}+2$.

Figure 4:
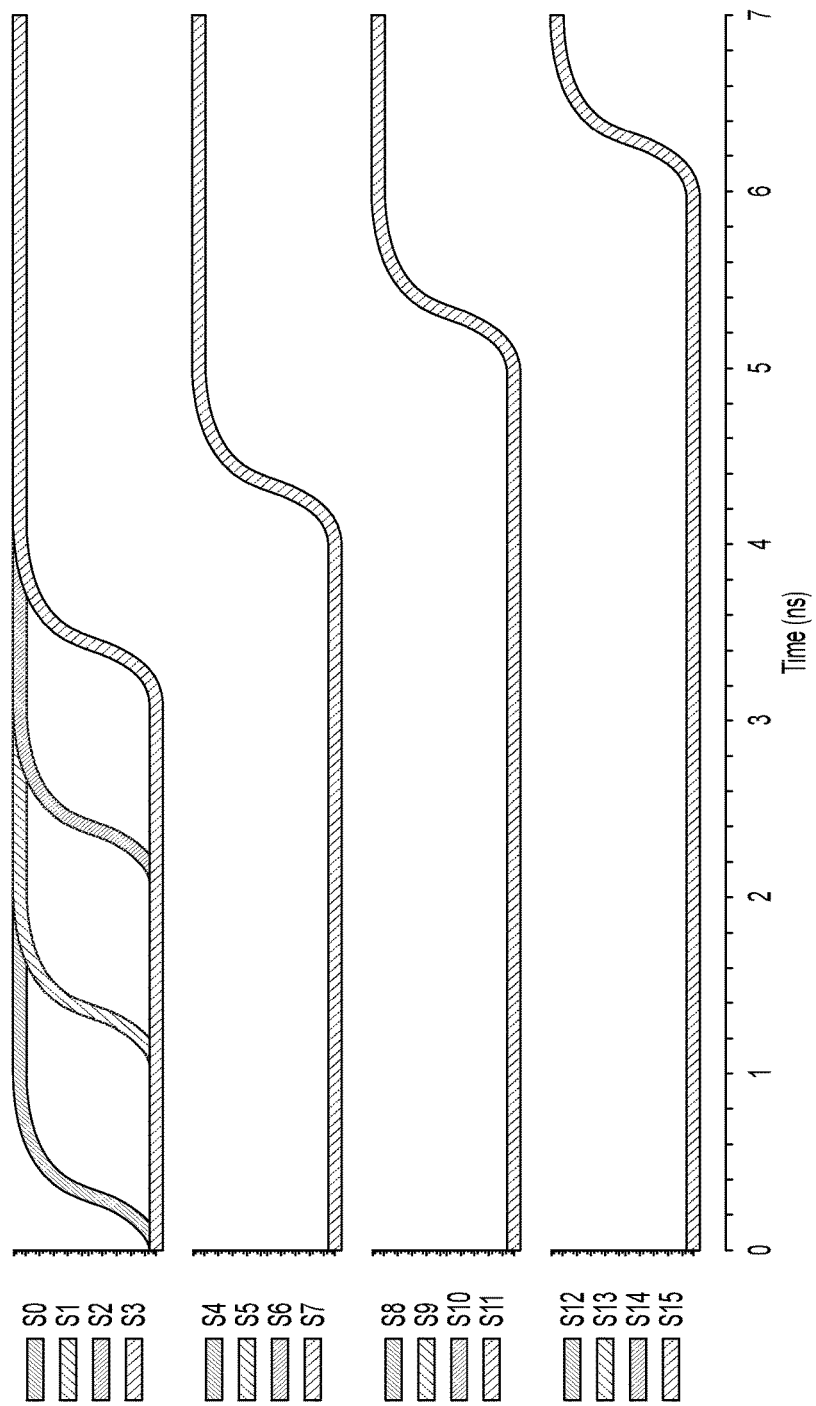
FIG. 4 illustrates a waveform of a 16-bit MAD carry select adder completing in 7 steps in accordance with an embodiment of the present invention.

A waveform of a 16-bit MAD carry select adder 300 completing in 7 steps is shown in FIG. 4 in accordance with an embodiment of the present invention. The first k bits resolve in the first k steps. Then, each k-bit block resolves in each subsequent step—Bits 4-7 resolve in step 5, bits 8-11 in step 6, and bits 12-15 in step 7. Similar to the ripple carry adder 100, 200, the carry select adder circuitry 300 can be pipelined to begin a new addition every 4 steps.

Furthermore, the area of adder 300 is also less than alternative designs. Since each k-bit block only requires a single k-bit ripple carry adder, the componential area is 6 k memristors, 7 k resistors, 22 k switches, and 3 k+1 drivers per block. The first k-bit block is also simplified to a standard MAD ripple carry adder since it has a known carry-in value. The carry propagation logic requires 1 memristor, 1 resistor, 3 switches, and 1 driver in order to select the carry-out signal from the two candidates and store its value. The carry propagation logic 500 for the MAD carry select adder 300 is shown in FIG. 5 in accordance with an embodiment of the present invention.

Figure 5:
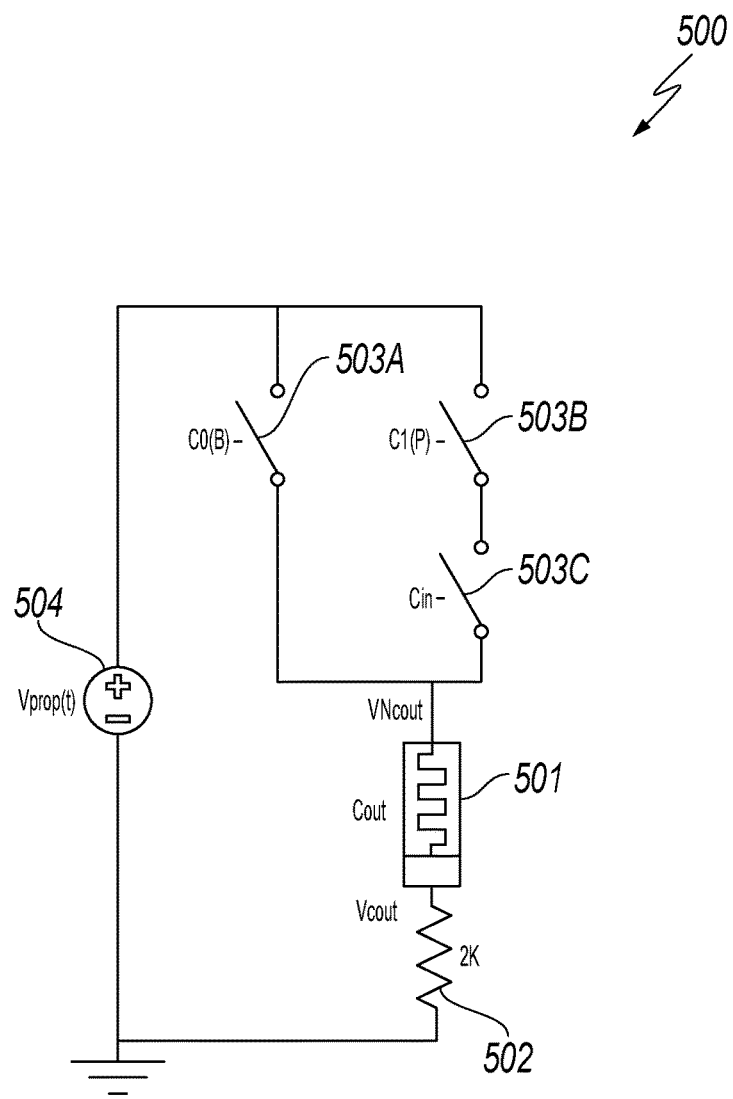
FIG. 5 illustrates the carry propagation logic for the MAD carry select adder in accordance with an embodiment of the present invention.

Referring to FIG. 5, carry propagation logic 500 includes a memristor 501 connected to ground via resistor 502 (value of 2K ohms in one embodiment). Furthermore, memristor 501 is connected to switches 503A, 503B, 503C, where switches 503B, 503C are connected in series and the combination of switches 503B, 503C is connected in parallel to switch 503A. Switches 503A, 503B are connected to voltage source 504 (Vprop(t)).

Figure 6:
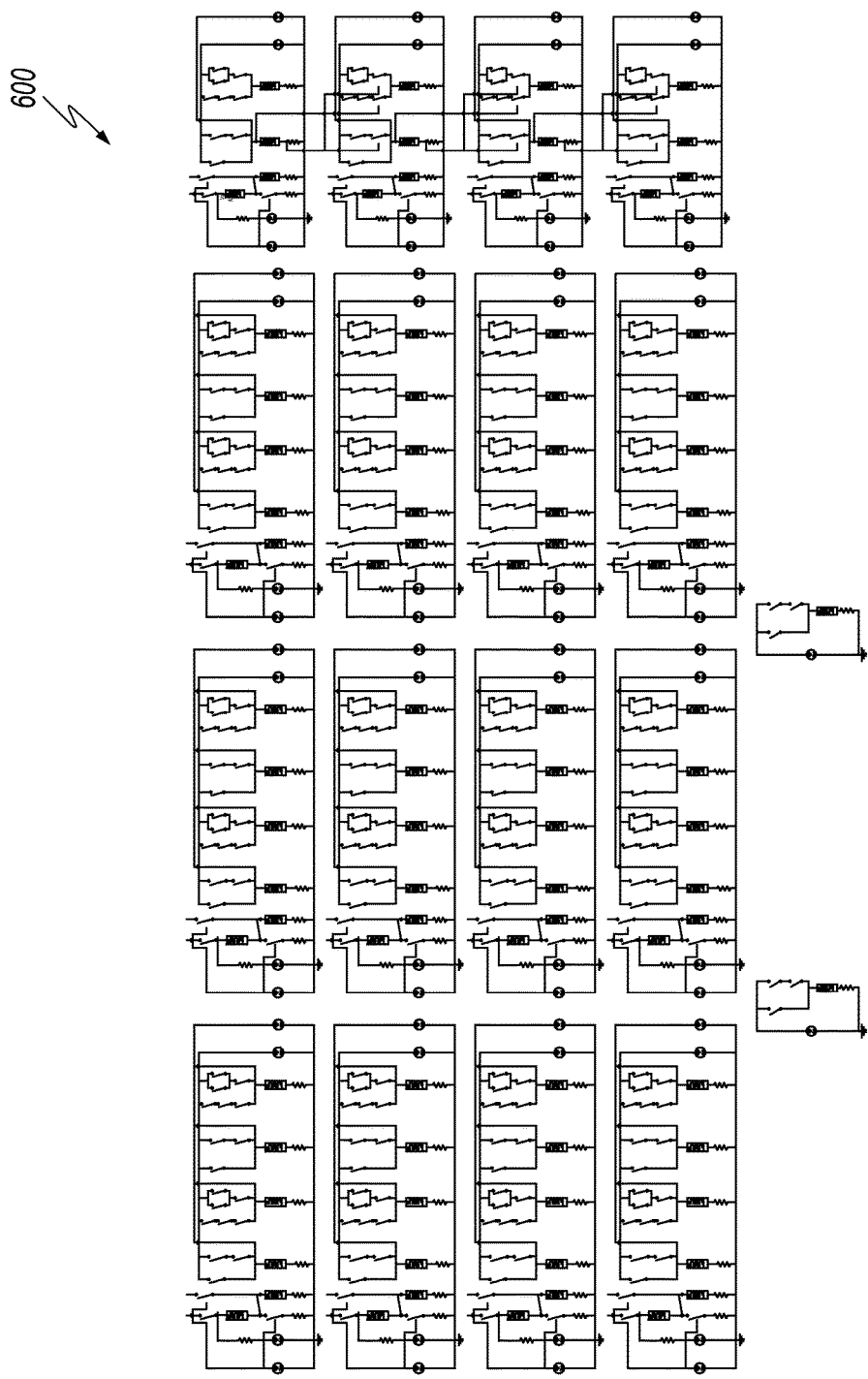
FIG. 6 is a schematic for a 16-bit MAD carry select adder in accordance with an embodiment of the present invention.

$V_{prop}$ applies a $V_{set}$ signal to the carry-out memristor which is gated by the equation G+PC. The functionality of this equation is achieved in the same manner as is done for the full adder, taking 1 cycle. Therefore, the total componential area for an N-bit carry select adder is (N−k)(6 memristors+7 resistors+22 switches+(3+1/k) drivers)+k(4 memristors+5 resistors+13 switches+3+1/k drivers) for the adders and ((N/k)−2)(1 memristor+1 resistor+3 switches+1 driver) for the carry propagation logic for a total of [6N+N/k−2] memristors+[7N+N/k−2] resistors+[22N+3N/k−6] switches+[3N+2N/k−2] drivers. A schematic for a 16-bit MAD carry select adder 600 is shown in FIG. 6 in accordance with an embodiment of the present invention. Redundant drivers are replicated in the schematic for readability but many can be shared and optimized out as described.

Figure 7:
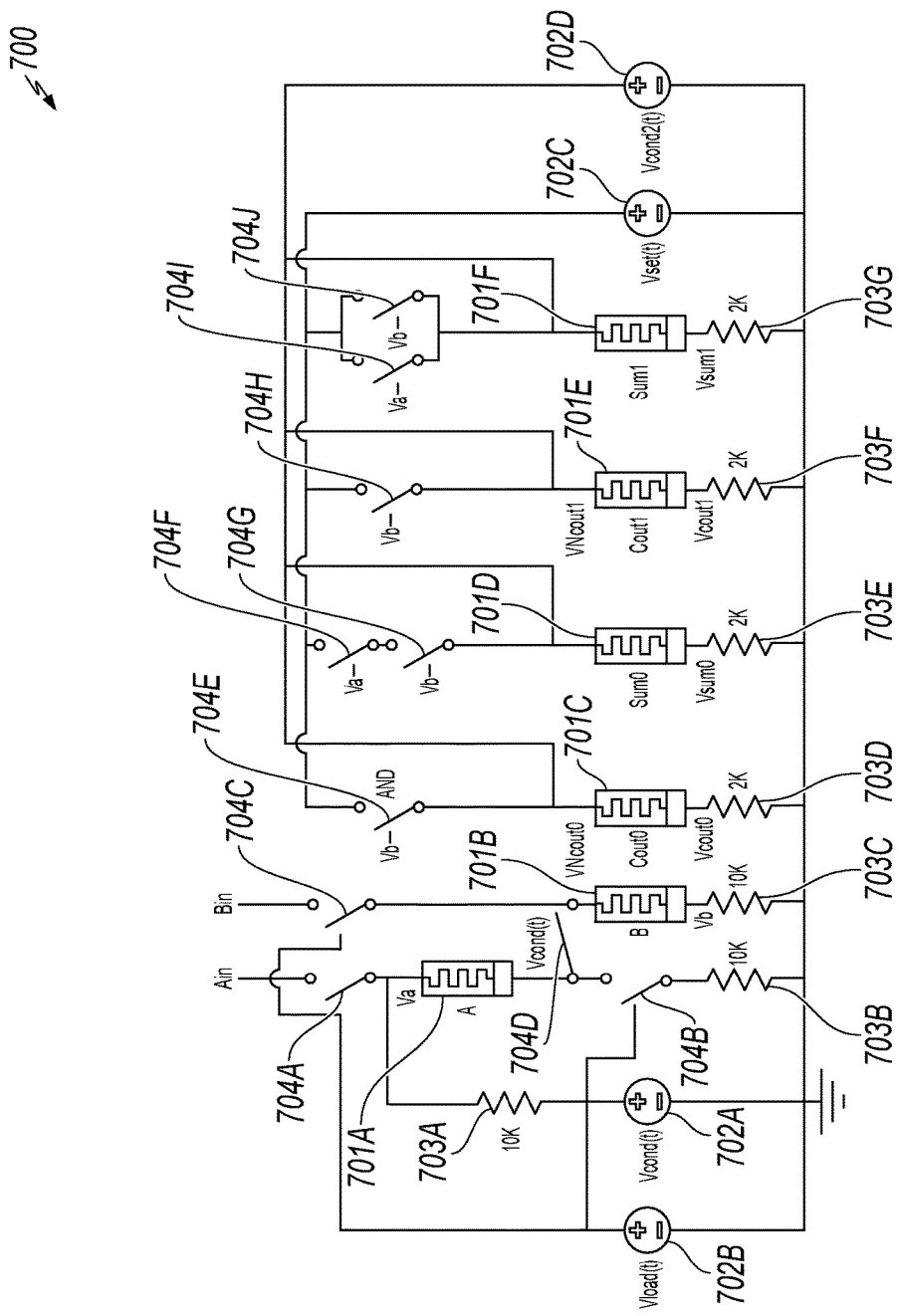
FIG. 7 illustrates a MAD modified half adder for even bits in a conditional sum adder in accordance with an embodiment of the present invention.

Another type of adder using the MAD implementation is the MAD conditional sum adder as discussed below. The discussion below focuses on the design of an 8-bit MAD-based conditional sum adder architecture. As described for the MAD carry select adders, each of the modified half adders can produce its four outputs, $C0_i$, $C1_i$, $S0_i$, and $S1_i$ in a single step once the carry-in is available. FIG. 7 illustrates a MAD modified half adder 700 for even bits in a conditional sum adder in accordance with an embodiment of the present invention.

Referring to FIG. 7, adder 700 includes memristors 701A, 701B connected in parallel. Memristor 701A is connected to power source 702A (Vcond(t)) via resistor 703A (value of 10K ohms in one embodiment). Additionally, memristor 701A is connected to switch 704A. Furthermore, memristor 701A is connected to switch 704B, which is connected to ground via resistor 703B (value of 10K ohms in one embodiment). Switches 704A, 704B are also connected to power source 702B (Vload(t)).

Memristor 701B is connected to ground via resistor 703C (value of 10K ohms in one embodiment). Furthermore, memristor 701B is connected to switch 704C, which is connected to power source 702B. Additionally, there is a switch 704D between memristors 701A, 701B which is driven by Vcond(t).

Memristor 701C is connected in parallel to memristor 701B. Memristor 701C is connected to ground via resistor 703D (value of 2K ohms in one embodiment). Furthermore, memristor 701C is connected to switch 704E which is connected to power source 702C (Vset(t)). Also, memristor 701C is connected to power source 702D (Vcond2($t$)).

Memristor 701D is connected in parallel to memristor 701C. Memristor 701D is connected to ground via resistor 703E (value of 2K ohms in one embodiment). Furthermore, memristor 701D is connected to switches 704F, 704G. Switches 704F, 704G are connected in series. Furthermore, switch 704F is connected to power source 702C. Additionally, memristor 701D is connected to power source 702D.

Memristor 701E is connected in parallel to memristor 701D. Memristor 701E is connected to ground via resistor 703F (value of 2K ohms in one embodiment). Furthermore, memristor 701E is connected to switch 704H, which is connected to power source 702C. Additionally, memristor 701E is connected to power source 702D.

Memristor 701F is connected in parallel to memristor 701E. Memristor 701F is connected to ground via resistor 703G (value of 2K ohms in one embodiment). Furthermore, memristor 701F is connected to switches 704I, 704J. Switches 704I, 704J are connected in parallel. Furthermore, switches 704H, 704I are connected to power source 702C. Additionally, memristor 701F is connected to power source 702D.

Referring to adder 700, a naïve approach would use this modified half adder design for every bit of the adder. Then, the first level 2-bit muxes would require an additional 8 switches and 2 memristors per multiplexer. However, this incurs a cost in both area and delay that is unnecessary if the design is optimized for the adder's context. Let the even bits' modified half adders resolve the four outputs in step 1 using the circuit in FIG. 7. In the next step, both the modified half adders for the odd bits and the multiplexers can resolve. The modified half adders for the even bits apply $V_{cond2}$ to the carry-out memristors. The voltages at $Vc_{out0}$ and $Vc_{out1}$ are then sensed for their values and used in conjunction with the logic in the next bit as shown in FIG. 8.

Figure 8:
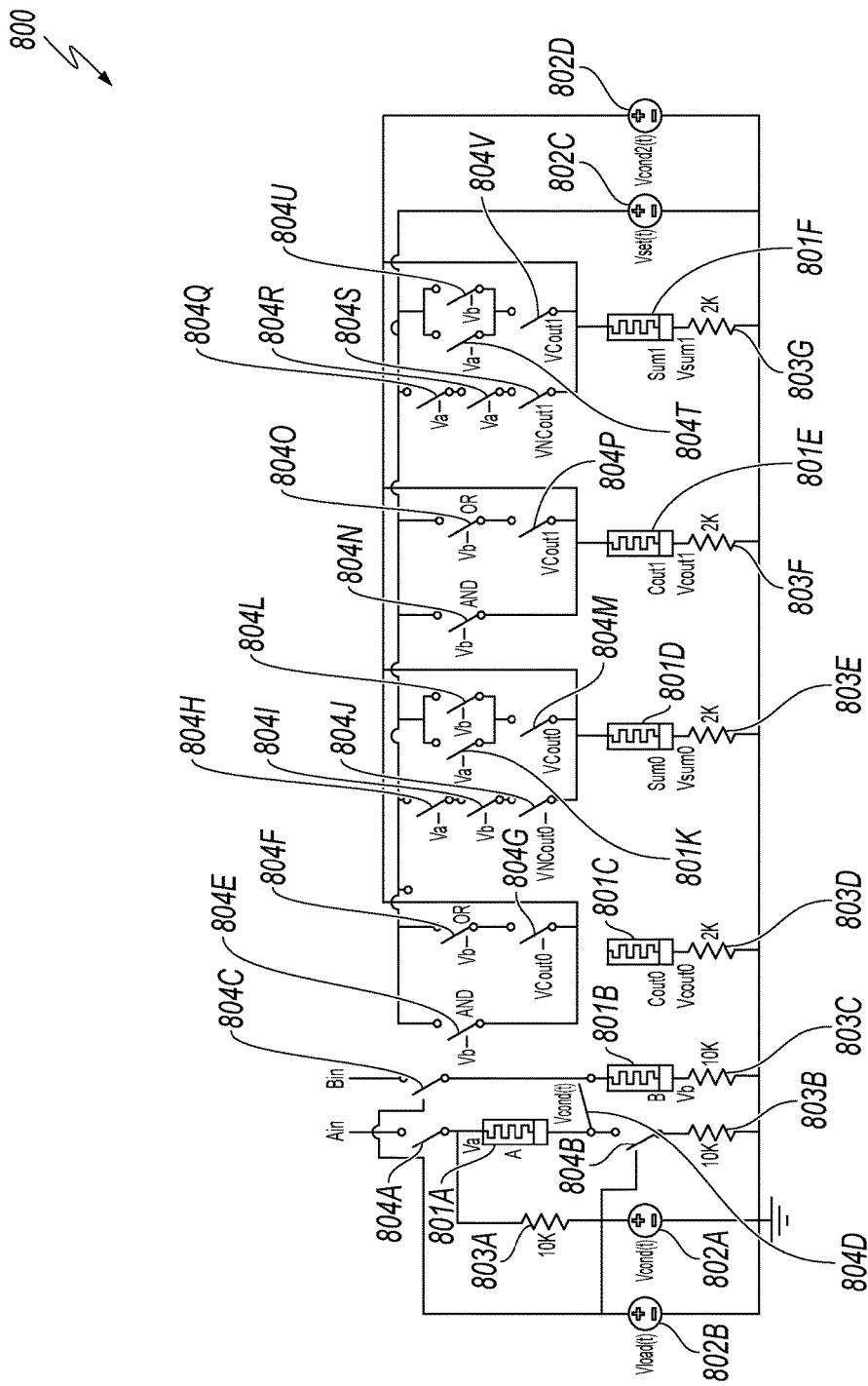
FIG. 8 illustrates a MAD modified half adder for odd bits in a conditional sum adder in accordance with an embodiment of the present invention.

FIG. 8 illustrates a MAD modified half adder 800 for odd bits in a conditional sum adder in accordance with an embodiment of the present invention. In one embodiment, adder 800 is substantially the same as adder 300 of FIG. 3.

As shown in FIG. 8, adder 800 includes memristors 801A, 801B connected in parallel. Memristor 801A is connected to power source 802A (Vcond(t)) via resistor 803A (value of 10K ohms in one embodiment). Furthermore, memristor 801A is connected to switch 804A. Furthermore, memristor 801A is connected to switch 804B, which is connected to ground via resistor 803B (value of 10K ohms in one embodiment). Additionally, switches 804A, 804B are connected to power source 802B (Vload(t)).

Memristor 801B is connected to ground via resistor 803C (value of 10K ohms in one embodiment). Furthermore, memristor 801B is connected to switch 804C, which is connected to power source 802B. Additionally, there is a switch 804D between memristors 801A, 801B which is driven by Vcond(t).

Memristor 801C is connected in parallel to memristor 801B. Memristor 801C is connected to ground via resistor 803D (value of 2K ohms in one embodiment). Furthermore, memristor 801C is connected to switches 804E, 804F, 804G, where switches 804F, 804G are connected in series and the combination of switches 804F, 804G is connected in parallel to switch 804E. Furthermore, switches 804E, 804F are connected to power source 802C (Vest(t)) and memristor 801C is connected to power source 802D (Vcond2($t$)).

Furthermore, memristor 801D is connected in parallel to memristor 801C. Memristor 801D is connected to ground via resistor 803E (value of 2K ohms in one embodiment). Additionally, memristor 801D is connected to switches 804H, 804I, 804J, 804K, 804L, 804M, where switches 804K, 804L are connected in parallel and the combination of switches 804K, 804L is connected in series to switch 804M. Furthermore, the combination of switches 804K, 804L, 804M is connected in parallel to the combination of switches 804H, 804I, 804J, where switches 804H, 804I and 804J are connected in series. Furthermore, switches 804H, 804K, 804L are connected to power source 802C. Additionally, memristor 801D is connected to power source 802D.

Memristor 801E is connected in parallel to memristor 801D. Memristor 801E is connected to ground via resistor 803F (value of 2K ohms in one embodiment). Furthermore, memristor 801E is connected to switches 804N, 804O, 804P, where switches 804O, 804P are connected in series and the combination of switches 804O, 804P is connected in parallel to switch 804N. Furthermore, switches 804N, 804O are connected to power source 802C and memristor 801E is connected to power source 802D.

Furthermore, memristor 801F is connected in parallel to memristor 801E. Memristor 801F is connected to ground via resistor 803G (value of 2K ohms in one embodiment). Memristor 801F is connected to switches 804Q, 804R, 804S, 804T, 804U, 804V, where switches 804T, 804U are connected in parallel and the combination of switches 804T, 804U is connected in series to switch 804V. Furthermore, the combination of switches 804T, 804U, 804V is connected in parallel to the combination of switches 804Q, 804R, 804S, where switches 804Q, 804R and 804S are connected in series. Furthermore, switches 804Q, 804T, 804U are connected to power source 802C. Additionally, memristor 801F is connected to power source 802D.

Referring to adder 800, this removes the need for the multiplexer logic by incorporating it into the modified half adders. The values of the output memristors can now be sensed in the same manner as described for the even bits and propagated to multiplexers in later levels of the addition. Thus, each level of the conditional sum adder incurs a single bit delay. The total delay for an N-bit conditional sum adder is log(N)+1.

Figure 9:
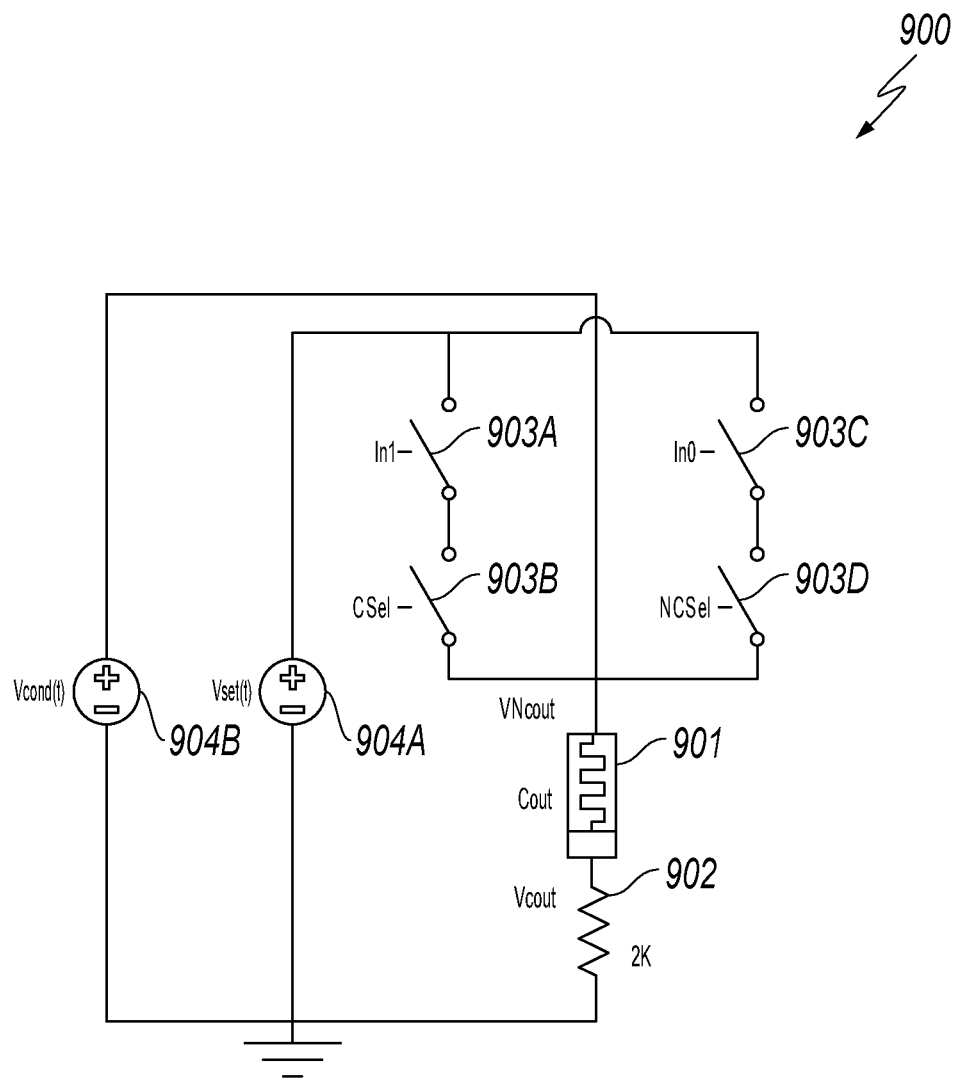
FIG. 9 illustrates the MAD multiplexer for a conditional sum adder in accordance with an embodiment of the present invention.

All of the remaining multiplexers require 1 memristor, 1 resistor, 4 switches, and 2 drivers per output each. The circuitry for these multiplexers is shown in FIG. 9. FIG. 9 illustrates the MAD multiplexer 900 for a conditional sum adder in accordance with an embodiment of the present invention.

Referring to FIG. 9, multiplexer 900 includes a memristor 901 connected to ground via a resistor 902 (value of 2K ohms in one embodiment). Furthermore, memristor 901 is connected to switches 903A, 903B, 903C and 903D, where switches 903A, 903B are connected in series and switches 903C, 903D are connected in series and where the combination of switches 903A, 903B are connected in parallel to the combination of switches 903C, 903D. Switches 903A, 903C are connected to power source 904A (Vset(t)), which is connected to ground. Also, memristor 901 is connected to power source 904B (Vcond(t)), which is connected to ground.

Concerning multiplexer 900, the $V_{set}$ signal is applied at the same time that the $V_{cond}$ signal is applied to both the inputs of the multiplexer, denoted by In1 and In0, and to the carry-out signals used as the select line. Whenever this output is needed, the $V_{cond}$ signal is applied to facilitate reading its voltage. The $V_{set}$ and $V_{cond}$ signals can be shared across all multiplexers on the same level in the adder design as long as these values are set and read at the same steps in execution.

Figure 10:
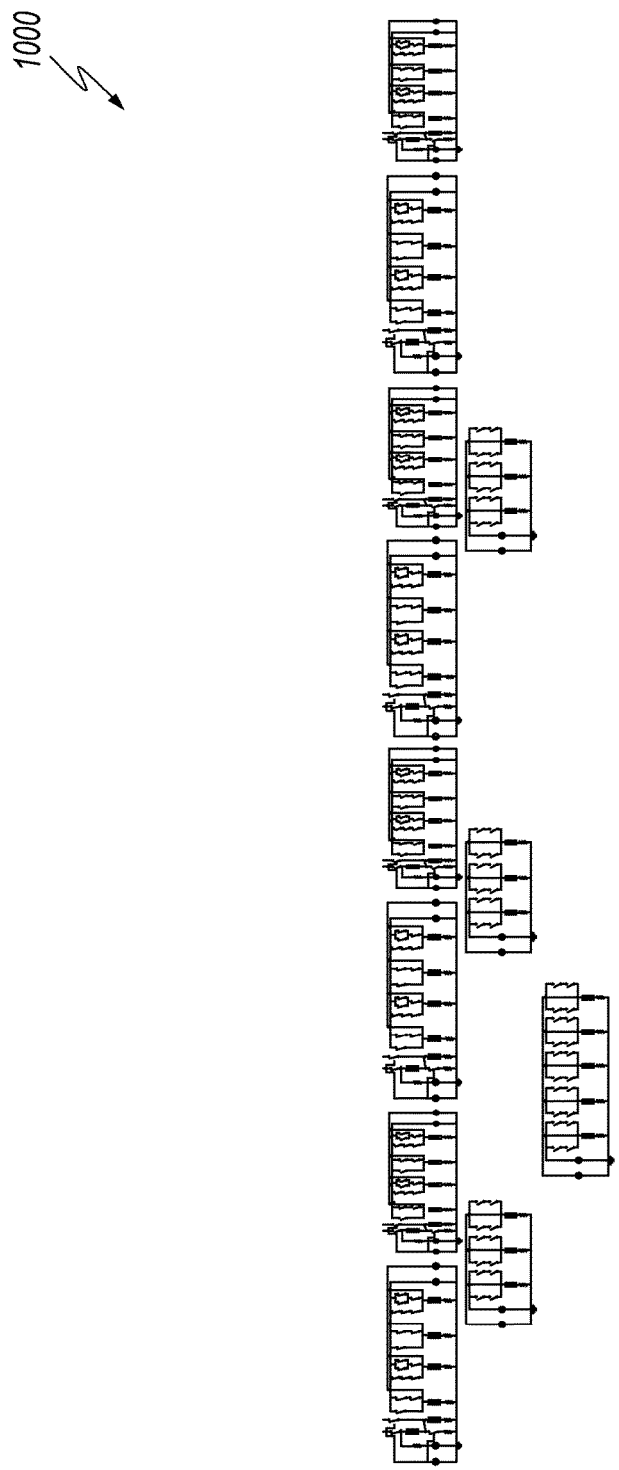
FIG. 10 illustrates a schematic for an 8-bit MAD conditional sum adder in accordance with an embodiment of the present invention.

The total complexity consists of the area of the modified half adders and the multiplexers. A schematic for an 8-bit MAD conditional sum adder 1000 is shown in FIG. 10 in accordance with an embodiment of the present invention.

Redundant drivers are shown to make functionality clear, however, many can be optimized out. For example, as described earlier, all of the multiplexers on the same level in the design can share the $V_{cond}$ and $V_{set}$ drivers. By the same logic, all of the even-bit adders can share their drivers and all of the odd-bit adders can too. This implies that the number of drivers only increases by 2 each time the adder width doubles. Even-bit modified half adders require a total of 3N memristors, 7N/2 resistors, and 5N switches. The odd bit modified half adders require a total of 3N memristors, 7N/2 resistors, and 11N switches. Each 1-bit multiplexer requires 1 memristor, 1 resistor, and 4 switches. Thus, for an 8-bit addition the total complexity is 62 memristors+70 resistors+184 switches+12 drivers.

Figure 11:
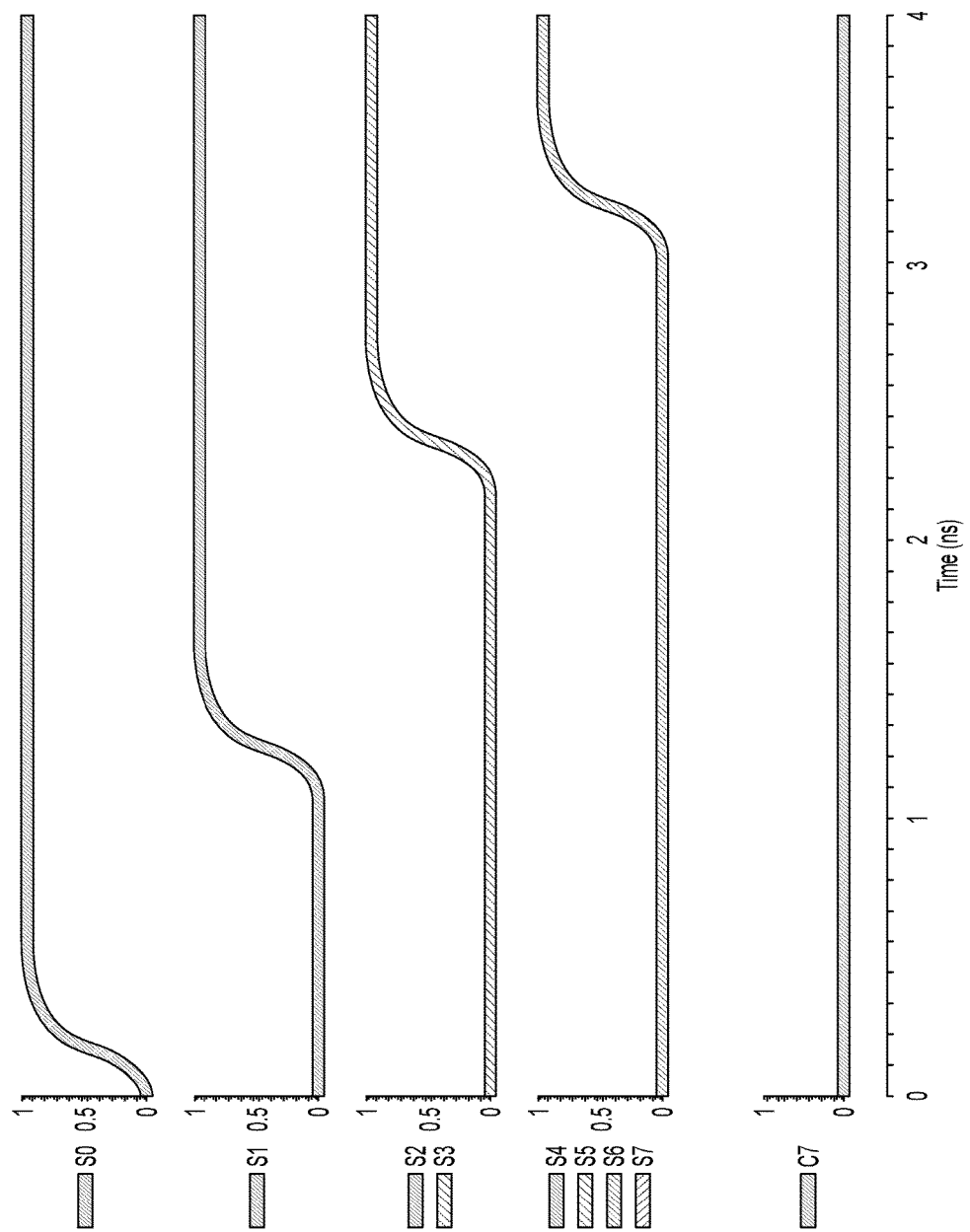
FIG. 11 illustrates the 8-bit MAD conditional sum adder execution for 0x0+0xFF in accordance with an embodiment of the present invention.

The MAD design requires log(N)+1 steps to complete an addition. In other words, the delay only increases by a single step each time the width of the adder doubles. A waveform showing the completion of an 8-bit addition in 4 steps is shown in FIG. 11. FIG. 11 illustrates the 8-bit MAD conditional sum adder execution for 0x0+0xFF in accordance with an embodiment of the present invention.

The first sum bit resolves in the first step and the second bit resolves in the second. After that, each level of multiplexers resolves in a subsequent step.

The first level of the adder is complete after 2 steps. Thus, to pipeline additions, the circuitry can reset its memristors in step 3, load the inputs in step 4, and begin execution again in step 5. Thus, similar to the MAD ripple carry adder and carry select adder, a new addition can begin every 4 steps.

Figure 12:
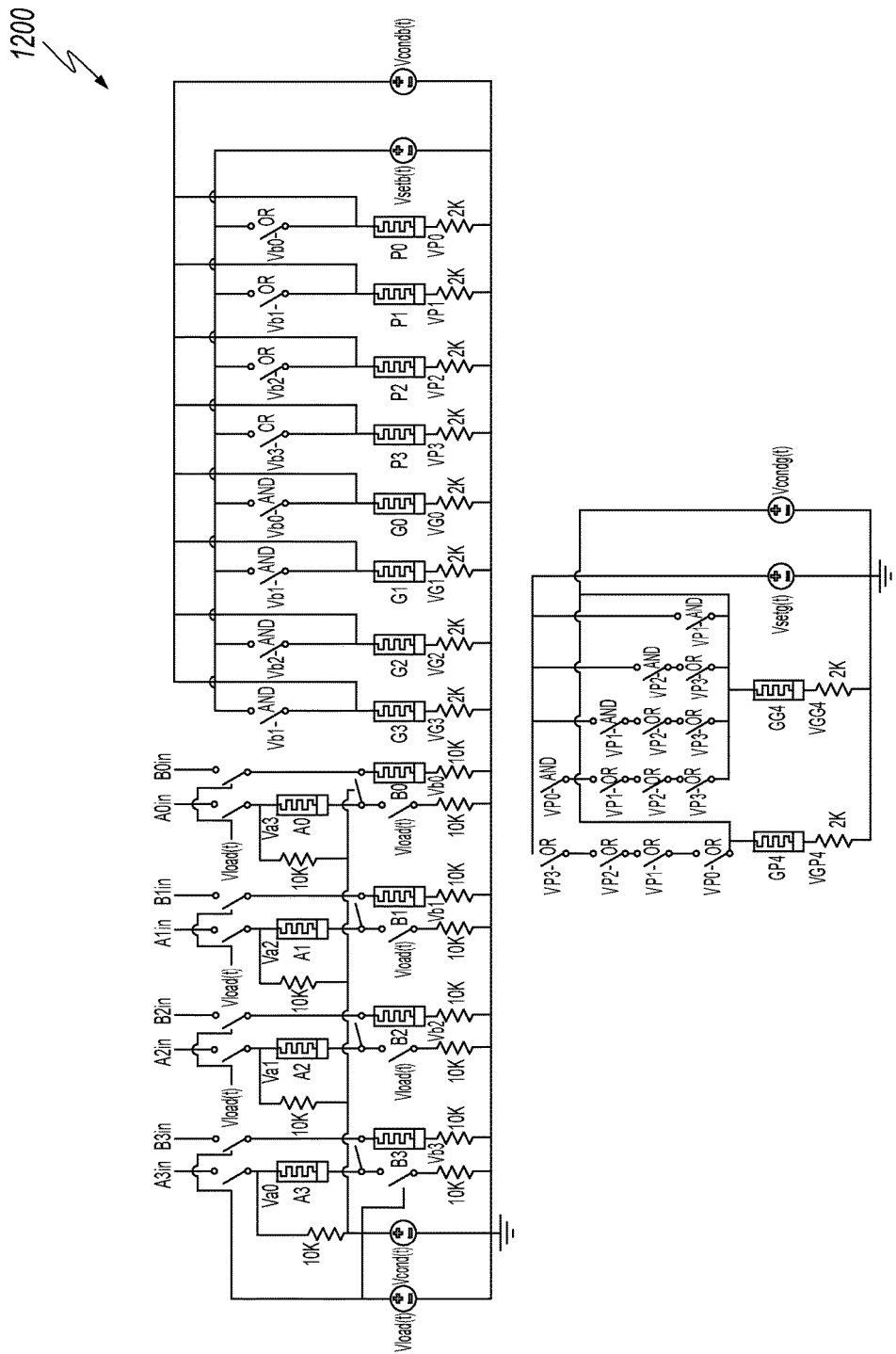
FIG. 12 is the baseline implementation of MAD GG and GP logic for a 4-bit block in a carry lookahead adder in accordance with an embodiment of the present invention.

Another type of adder using the MAD implementation is the MAD carry lookahead adder 1200 as discussed below in connection with FIG. 12. FIG. 12 is the baseline implementation of MAD GG and GP logic for a 4-bit block in a carry lookahead adder in accordance with an embodiment of the present invention.

Referring to FIG. 12, propagate is equivalent to A OR B or A XOR B, and generate is equivalent to A AND B. To obtain these Boolean values, A $V_{cond}$ signal would be applied to the inputs A and B in series within each full adder while a $V_{set}$ signal would be applied to an output memristor for G and for P. The voltage at the p terminal of the B memristor would be sensed to determine whether $V_{set}$ was gated to the G or P memristor. Essentially, P=($V_b$==OR) and G=($V_b$==AND). The P and G logic would require 6 k switches, 4 k memristors, 5 k resistors, and 4 drivers for the k-bit block.

Then, when the G(P) value is used for resolving a carry signal or a group signal, a $V_{cond}$ signal must be applied to the G(P) memristor and a $V_{set}$ is applied to the carry-out or GG(GP) memristor. For example, GP=P0P1P2P3. Thus, to resolve the GP memristor, a $V_{cond}$ signal would be applied to each of the P memristors and the p terminals would be sensed. The GP memristor would be applied a $V_{set}$ signal that is gated by a series of 4 switches, each driven by one of the P memristors. The group generate signal for each 4-bit block is computed as GG=G3+P3G2+P3P2G1+P3P2P1G0. This can be implemented in the MAD context with a parallel set of switches in series as shown in FIG. 12.

Each path from $V_{set}$ to the memristor represents one of the AND statements above. By placing them in series, if any of the paths resolves to true, the group generate signal memristor will be set to 1, achieving the OR functionality. The GP and GG logic adds 14 switches, 2 memristors, 2 resistors, and 2 drivers to the circuitry for a total of 6 k+14 switches, 4 k+2 memristors, 5 k+2 resistors, and 6 drivers.

Instead, consider the design with the P and G signals removed. The voltages sensed on the input memristors can be used directly by the carry signals and GG and GP signals. This bypasses the need for the individual bits's P and G signals while maintaining identical functionality. This also removes a step from the overall delay. The resultant circuitry for a 4-bit block is shown in FIG. 13, which illustrates an optimized implementation of MAD GG and GP logic 1300 for a 4-bit block in a carry lookahead adder in accordance with an embodiment of the present invention.

Figure 13:
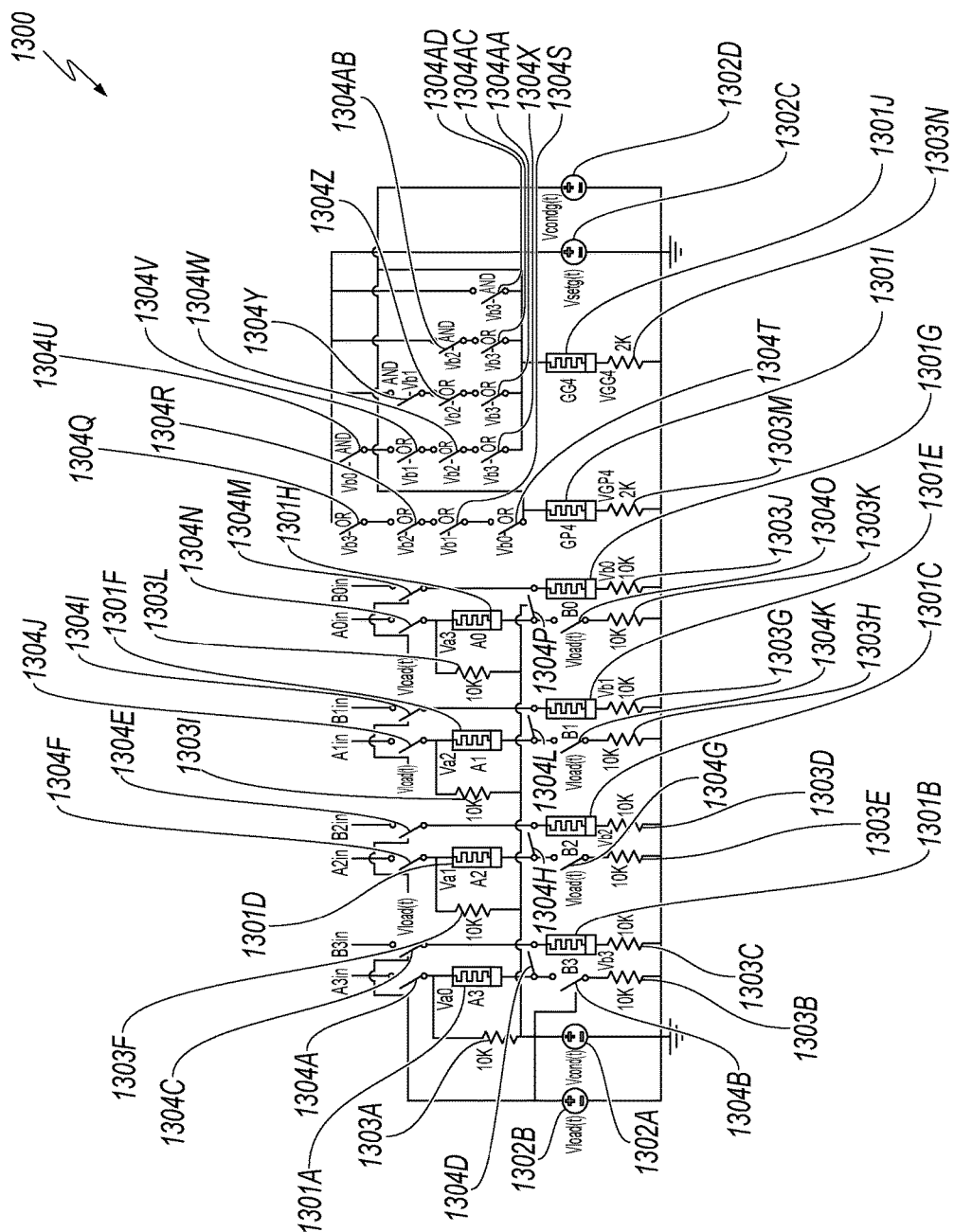
FIG. 13 illustrates an optimized implementation of MAD GG and GP logic for a 4-bit bock in a carry lookahead adder in accordance with an embodiment of the present invention.

Referring to FIG. 13, MAD GG and GP logic 1300 includes memristors 1301A, 1301B connected in parallel. Memristor 1301A is connected to power source 1302A (Vcond(t)) via resistor 1303A (value of 10K ohms in one embodiment). Furthermore, memristor 1301A is connected to switch 1304A. Furthermore, memristor 1301A is connected to switch 1304B, which is connected to ground via resistor 1303B (value of 10K ohms in one embodiment). Additionally, switches 1304A, 1304B are connected to power source 1302B (Vload(t)).

Memristor 1301B is connected to ground via resistor 1303C (value of 10K ohms in one embodiment). Furthermore, memristor 1301B is connected to switch 1304C, which is connected to power source 1302B. Additionally, there is a switch 1304D between memristors 1301A, 1301B.

Memristor 1301C is connected in parallel to memristor 1301B. Memristor 1301C is connected to ground via resistor 1303D (value of 10K ohms in one embodiment). Furthermore, memristor 1301C is connected to switch 1304E driven by Vload(t).

Furthermore, memristor 1301D is connected in parallel to memristor 1301A. Furthermore, memristor 1301D is connected to switch 1304F driven by Vload(t) and connected to switch 1304G driven by Vload(t), which is connected to ground via resistor 1303E (value of 10K ohms in one embodiment). Additionally, memristor 1301D is connected to power source 1302A via resistor 1303F (value of 10K ohms in one embodiment). Additionally, there is a switch 1304H between memristors 1301C, 1301D.

Memristor 1301E is connected in parallel to memristor 1301C. Memristor 1301E is connected to ground via resistor 1303G (value of 10K ohms in one embodiment). Furthermore, memristor 1301E is connected to switch 1304I driven by Vload(t).

Furthermore, memristor 1301F is connected in parallel to memristor 1301D. Furthermore, memristor 1301F is connected to switch 1304J driven by Vload(t) and connected to switch 1304K driven by Vload(t), which is connected to ground via resistor 1303H (value of 10K ohms in one embodiment). Additionally, memristor 1301F is connected to power source 1302A via resistor 1303I (value of 10K ohms in one embodiment). Additionally, there is a switch 1304L between memristors 1301E, 1301F.

Memristor 1301G is connected in parallel to memristor 1301E. Memristor 1301G is connected to ground via resistor 1303J (value of 10K ohms in one embodiment). Furthermore, memristor 1301G is connected to switch 1304M driven by Vload(t).

Furthermore, memristor 1301H is connected in parallel to memristor 1301F. Furthermore, memristor 1301H is connected to switch 1304N driven by Vload(t) and connected to switch 1304O driven by Vload(t), which is connected to ground via resistor 1303K (value of 10K ohms in one embodiment). Additionally, memristor 1301H is connected to power source 1302A via resistor 1303L (value of 10K ohms in one embodiment). Additionally, there is a switch 1304P between memristors 1301G, 1301H.

Additionally, memristor 1301I is connected in parallel to memristor 1301G. Furthermore, memristor 1301I is connected to ground via resistor 1303M (value of 2K ohms in one embodiment). Furthermore, memristor 1301I is connected to switches 1304Q, 1304R, 1304S and 1304T, where switches 1304Q, 1304R, 1304S and 1304T are connected in series. Furthermore, switch 1304Q is connected to switch 1302C (Vsetg(t)). Additionally, memristor 1301I is connected to power source 1302D (Vcondg(t)).

Furthermore, memristor 1301J is connected in parallel to memristor 1301I. Furthermore, memristor 1301J is connected to ground via resistor 1303N (value of 2K ohms in one embodiment). Additionally, memristor 1301J is connected to switches 1304U, 1304V, 1304W, 1304X, 1304Y, 1304Z, 1304AA, 1304AB, 1304AC and 1304AD. Switches 1304U, 1304V, 1304W and 1304X are connected in series. Furthermore, switches 1304Y, 1304Z and 1304AA are connected in series. Additionally, switches 1304AB and 1304AC are connected in series. Furthermore, the combination of switches 1304U, 1304V, 1304W and 1304X is connected in parallel to the combination of switches 1304Y, 1304Z and 1304AA, which is connected in parallel to the combination of switches 1304AB and 1304AC, which is connected in parallel to switch 1304AD.

Additionally, switches 1304U, 1304Y, 1304AB and 1304AD are connected to power source 1302C. Furthermore, memristor 1301J is connected to power source 1302D.

A $V_{cond}$ signal is still applied to the original memristors A and B. Now, the voltage at the p terminal of the B memristor is used as the driver for the gate on the $V_{Set}$ signal to the output carry and group signals directly. Recall that each $P_i$ bit is equivalent to A OR B and is being bypassed in the MAD context. Thus, in the first step of execution, $V_{cond}$ is still applied to all of the input memristors $A_i$ and $B_i$ in each full adder. The p-terminals of each B memristor are then sensed to represent $P_i$ and drive the $V_{set}$ signal on the switches for the group propagate memristor such that GP= $(V_{b0}==OR) (V_{b1}==OR) (V_{b2}==OR) (V_{b3}==OR)$.

A similar translation is performed for the group generate signal, relying on the $V_{ai}$ and $V_{bi}$ signals directly rather than intermediate bits' P and G results. These optimizations reduce the total complexity of the GG and GP logic in the 4-bit block to 4 k+14 switches, 2 k+2 memristors, 3 k+2 resistors, and 4 drivers.

The internal carry bits inside the 4-bit block can be resolved in parallel to the GG and GP signals by probing the same terminal on the input B memristors. These can be constructed with the MAD methodology in the same manner as described for the GG and GP signals.

$$CO_0 = G0 + P0C_{in}$$

$$CO_1 = G1 + P1G0 + P1P0C_{in}$$

$$CO_2 = G2 + P2G1 + P2P1G0 + P2P1P0C_{in}$$

This can be rewritten as $$CO_0 = (V_{b0}==AND) + (V_{b0}==OR)C_{in}$$

$$CO_1 = (V_{b1}==AND) + (V_{b1}==OR)(V_{b0}==AND) + (V_{b1}==OR)(V_{b0}==OR)C_{in}$$

$$CO_2 = (V_{b2}==AND) + (V_{b2}==OR)(V_{b1}==AND) + (V_{b2}==OR)(V_{b1}==OR)(V_{b0}==AND) + (V_{b2}==OR)(V_{b1}==OR)(V_{b0}==OR)C_{in}$$

Figure 14:
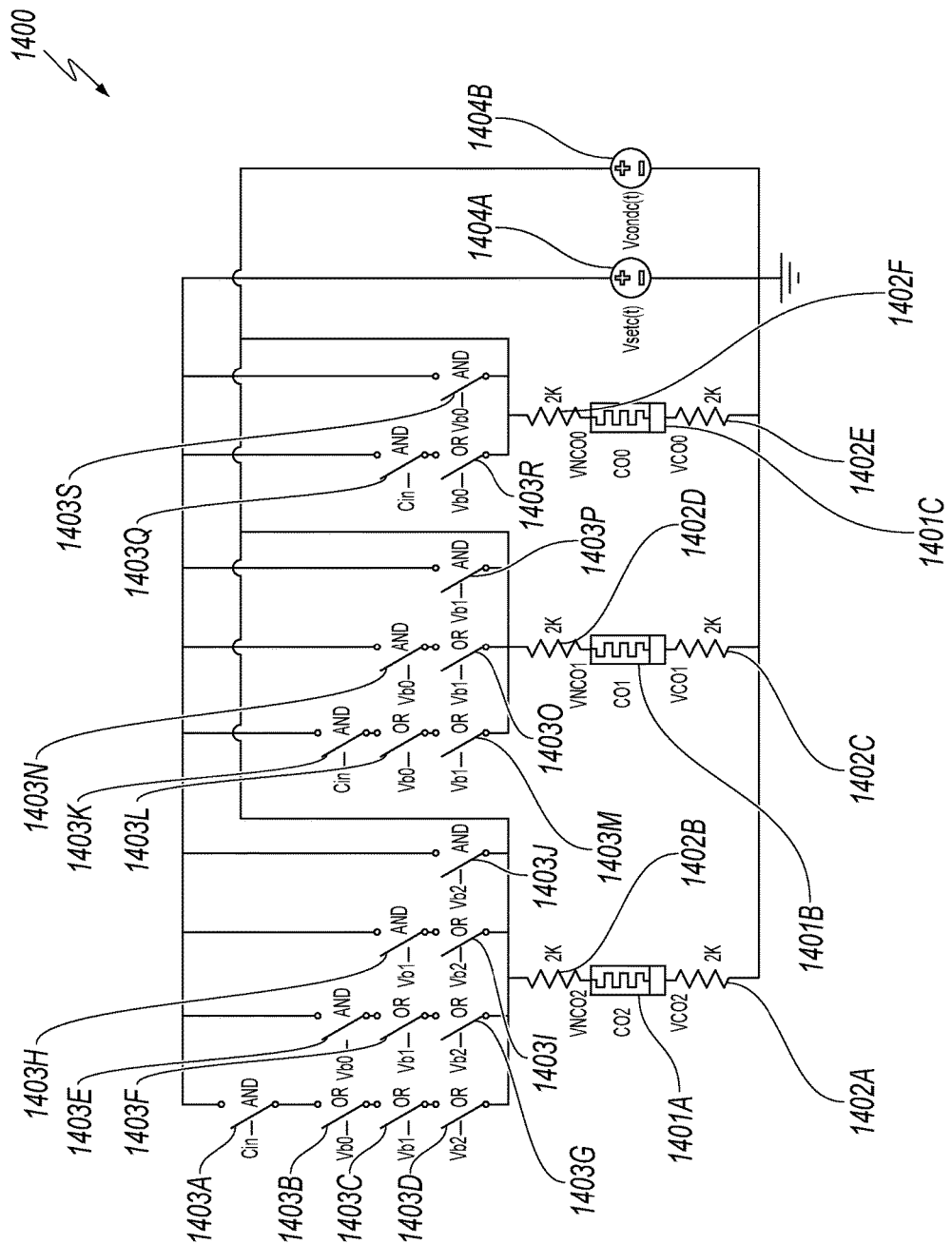
FIG. 14 illustrates an optimized implementation of MAD carry logic for a 4-bit block in a carry lookahead adder in accordance with an embodiment of the present invention.

FIG. 14 shows the resulting circuitry for these carry signals in a 4-bit block. FIG. 14 illustrates an optimized implementation of MAD carry logic 1400 for a 4-bit block in a carry lookahead adder in accordance with an embodiment of the present invention.

Referring to FIG. 14, MAD carry logic 1400 in a carry lookahead adder includes a memristor 1401A connected to ground via a resistor 1402A (value of 2K ohms in one embodiment). Memristor 1401A is further connected to switches 1403A, 1403B, 1403C, 1403D, 1403E, 1403F, 1403G, 1403H, 1403I and 1403J via resistor 1402B (value of 2K ohms in one embodiment). Switches 1403A, 1403B, 1403C and 1403D are connected in series. Furthermore, switches 1403E, 1403F and 1403G are connected in series. Additionally, switches 1403H and 1403I are connected in series. Furthermore, the combination of switches 1403A, 1403B, 1403C and 1403D are connected in parallel to the combination of switches 1403E, 1403F and 1403G, which are connected in parallel to the combination of switches 1403H and 1403I, which are connected in parallel to switch 1403J.

Memristor 1401B is connected in parallel to memristor 1401A. Memristor 1401B is connected to ground via resistor 1402C (value of 2K ohms in one embodiment). Furthermore, memristor 1401B is connected to switches 1403K, 1403L, 1403M, 1403N, 14030 and 1403P via resistor 1402D (value of 2K ohms in one embodiment). Switches 1403K, 1403L and 1403M are connected in series. Furthermore, switches 1403N and 14030 are connected in series. Additionally, the combination of switches 1403K, 1403L and 1403M are connected in parallel to the combination of switches 1403N and 1403O, which are connected in parallel to switch 1403P.

Memristor 1401C is connected in parallel to memristor 1401B. Memristor 1401C is connected to ground via resistor 1402E (value of 2K ohms in one embodiment). Furthermore, memristor 1401C is connected to switches 1403Q, 1403R and 1403S via resistor 1402F (value of 2K ohms in one embodiment). Switches 1403Q and 1403R are connected in series. Furthermore, the combination of switches 1403Q and 1403R are connected in parallel to switch 1403S.

Furthermore, switches 1403A, 1403E, 1403H, 1403J, 1403K, 1403N, 1403P, 1403Q and 1403S are connected to power source 1404A (Vsetc(t)), which is connected to ground. Additionally, resistors 1402B, 1402D and 1402F are connected to power source 1404B (Vcondc(t)), which is connected to ground.

Figure 15:
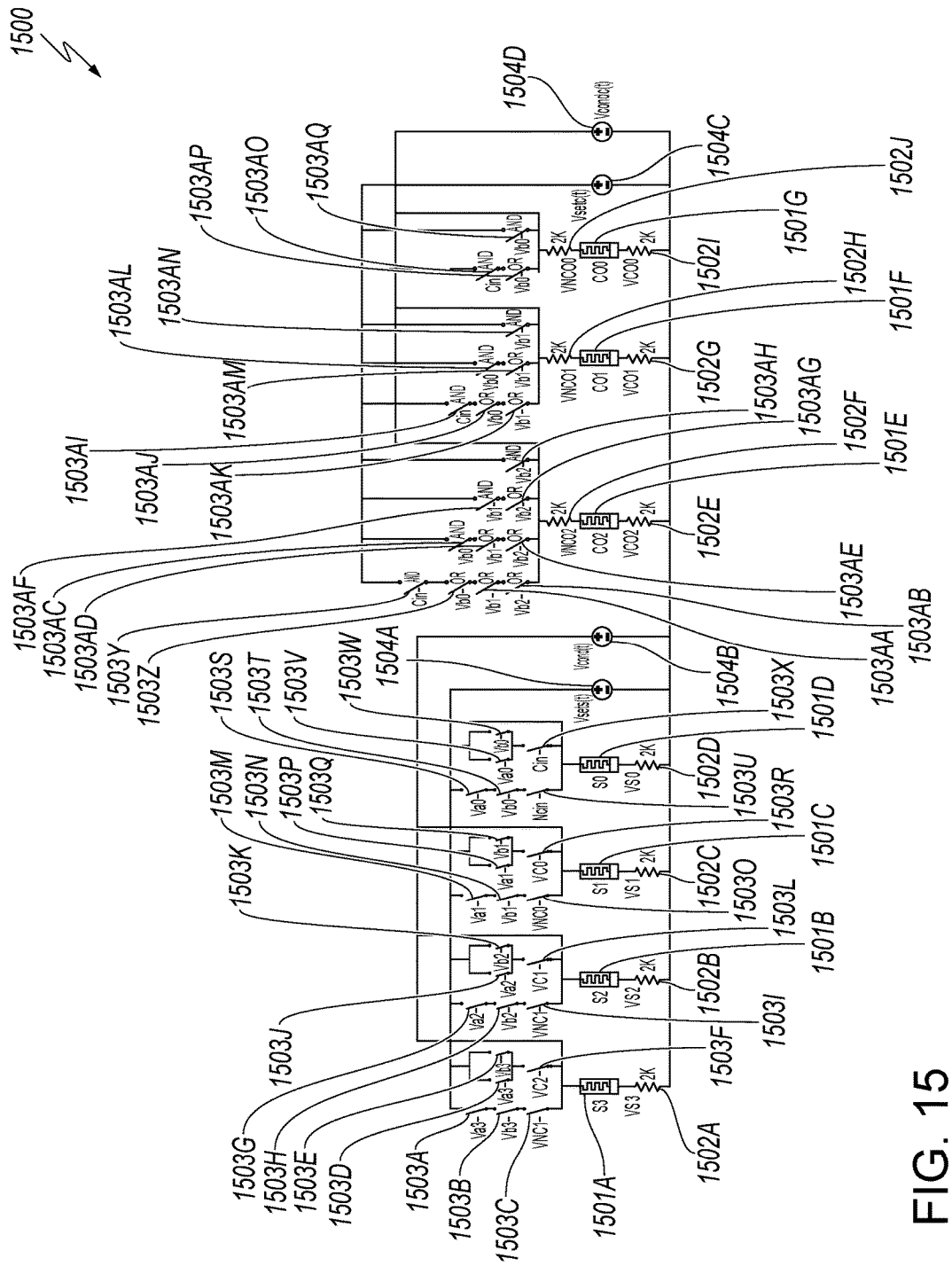
FIG. 15 illustrates an optimized implementation of MAD sum logic for a 4-bit block in a carry lookahead adder in accordance with an embodiment of the present invention.

The sum logic presented for the MAD full adder is reused in this design and can be seen in FIG. 15, which is an optimized implementation of MAD sum logic 1500 for a 4-bit block in a carry lookahead adder in accordance with an embodiment of the present invention.

Referring to FIG. 15, MAD sum logic 1500 in a carry lookahead adder includes a memristor 1501A connected to ground via resistor 1502A (value of 2K ohms in one embodiment). Memristor 1501A is connected to switches 1503A, 1503B, 1503C, 1503D, 1503E and 1503F. Switches 1503A, 1503B and 1503C are connected in series. Switches 1503D and 1503E are connected in parallel. Furthermore, the combination of switches 1503D and 1503E are connected in series with switch 1503F. Additionally, the combination of switches 1503A, 1053B and 1503C is connected in parallel to the combination of switches 1503D, 1503E and 1503F.

Memristor 1501B is connected in parallel to memristor 1501A. Memristor 1501B is connected to ground via resistor 1502B (value of 2K ohms in one embodiment). Furthermore, memristor 1501B is connected to switches 1503G, 1503H, 1503I, 1503J, 1503K and 1503L. Switches 1503G, 1503H and 1503I are connected in series. Switches 1503J and 1503K are connected in parallel. Furthermore, the combination of switches 1503J and 1503K are connected in series with switch 1503L. Additionally, the combination of switches 1503G, 1503H and 1503I is connected in parallel to the combination of switches 1503J, 1503K and 1503L.

Memristor 1501C is connected in parallel to memristor 1501B. Memristor 1501C is connected to ground via resistor 1502C (value of 2K ohms in one embodiment). Furthermore, memristor 1501C is connected to switches 1503M, 1503N, 1503O, 1503P, 1503Q and 1503R. Switches 1503M, 1503N and 1503O are connected in series. Furthermore, switches 1503P and 1503Q are connected in parallel. Furthermore, the combination of switches 1503P and 1503Q are connected in series with switch 1503R. Additionally, the combination of switches 1503M, 1503N and 1503O are connected in parallel to the combination of switches 1503P, 1503Q and 1503R.

Memristor 1501D is connected in parallel to memristor 1501C. Memristor 1501D is connected to ground via resistor 1502D (value of 2K ohms in one embodiment). Furthermore, memristor 1501D is connected to switches 1503S, 1503T, 1503U, 1503V, 1503W and 1503X. Switches 1503S, 1503T and 1503U are connected in series. Furthermore, switches 1503V and 1503W are connected in parallel. Furthermore, the combination of switches 1503V and 1503W are connected in series with switch 1503X. Additionally, the combination of switches 1503S, 1503T and 1503U are connected in parallel to the combination of switches 1503V, 1503W and 1503X.

Furthermore, switches 1503A, 1503D, 1503E, 1503G, 1503J, 1503K, 1503M, 1503P, 1503Q, 1503S, 1503V and 1503W are connected to power source 1504A (Vsets(t)). Additionally, memristors 1501A, 1501B, 1501C and 1501D are connected to power source 1504B (Vcond(t)).

Additionally, memristor 1501E is connected in parallel to memristor 1501D. Memristor 1501E is connected to ground via resistor 1502E (value of 2K ohms in one embodiment). Furthermore, memristor 1501E is connected to switches 1503Y, 1503Z, 1503AA, 1503AB, 1503AC, 1503AD, 1503AE, 1503AF, 1503AG and 1503AH via resistor 1502F (value of 2K ohms in one embodiment). Switches 1503Y, 1503Z, 1503AA and 1503AB are connected in series. Furthermore, switches 1503AC, 1503AD and 1503AE are connected in series. Additionally, switches 1503AF and 1503AG are connected in series. Furthermore, the combination of switches 1503Y, 1503Z, 1503AA and 1503AB are connected in parallel to the combination of switches 1503AC, 1503AD and 1503AE, which are connected in parallel to the combination of switches 1503AF and 1503AG, which are connected in parallel to switch 1503AH.

Memristor 1501F is connected in parallel to memristor 1501E. Memristor 1501F is connected to ground via resistor 1502G (value of 2K ohms in one embodiment). Furthermore, memristor is connected to switches 1503AI, 1503AJ, 1503AK, 1503AL, 1503AM and 1503AN via resistor 1502H (value of 2K ohms in one embodiment). Switches 1503AI, 1503AJ and 1503AK are connected in series. Furthermore, switches 1503AL and 1503AM are connected in series. Additionally, the combination of switches 1503AI, 1503AJ and 1503AK are connected in parallel to the combination of switches 1503AL and 1503AM, which are connected in parallel to switch 1503AN Memristor 1501G is connected in parallel to memristor 1501F. Memristor 1501G is connected to ground via resistor 1502I (value of 2K ohms in one embodiment). Furthermore, memristor 1501G is connected to switches 1503AO, 1503AP and 1503AQ via resistor 1502J (value of 2K ohms in one embodiment). Switches 1503AO and 1503AP are connected in series. Furthermore, the combination of switches 1503AO and 1503AP are connected in parallel with switch 1503AQ.

Furthermore, switches 1503Y, 1503AC, 1503AF, 1503AH, 1053AI, 1503AL, 1503AN, 1503AO and 1503AQ are connected to power source 1504C (Vsetc(t)). Additionally, memristors 1501E, 1501F and 1501G are connected to power source 1504D (Vcondc(t)) with resistors 1502F, 1502H and 1502J.

It is noted that the same optimization performed to remove the need for G and P memristors cannot be done for carry signals. The carry signals necessarily need to be stored into an intermediate memristor. This is because both the carry signals and their inverse are required for resolving the sums. In order to obtain the inverse carry-in signal, the n terminal of the carry-in signals will also be sensed when $V_{cond}$ is applied to the carry memristor. Thus, these memristors are required. For the GG and GP signals, the inverse of the G and P signals were not required so their memristors could be removed.

Figure 16:
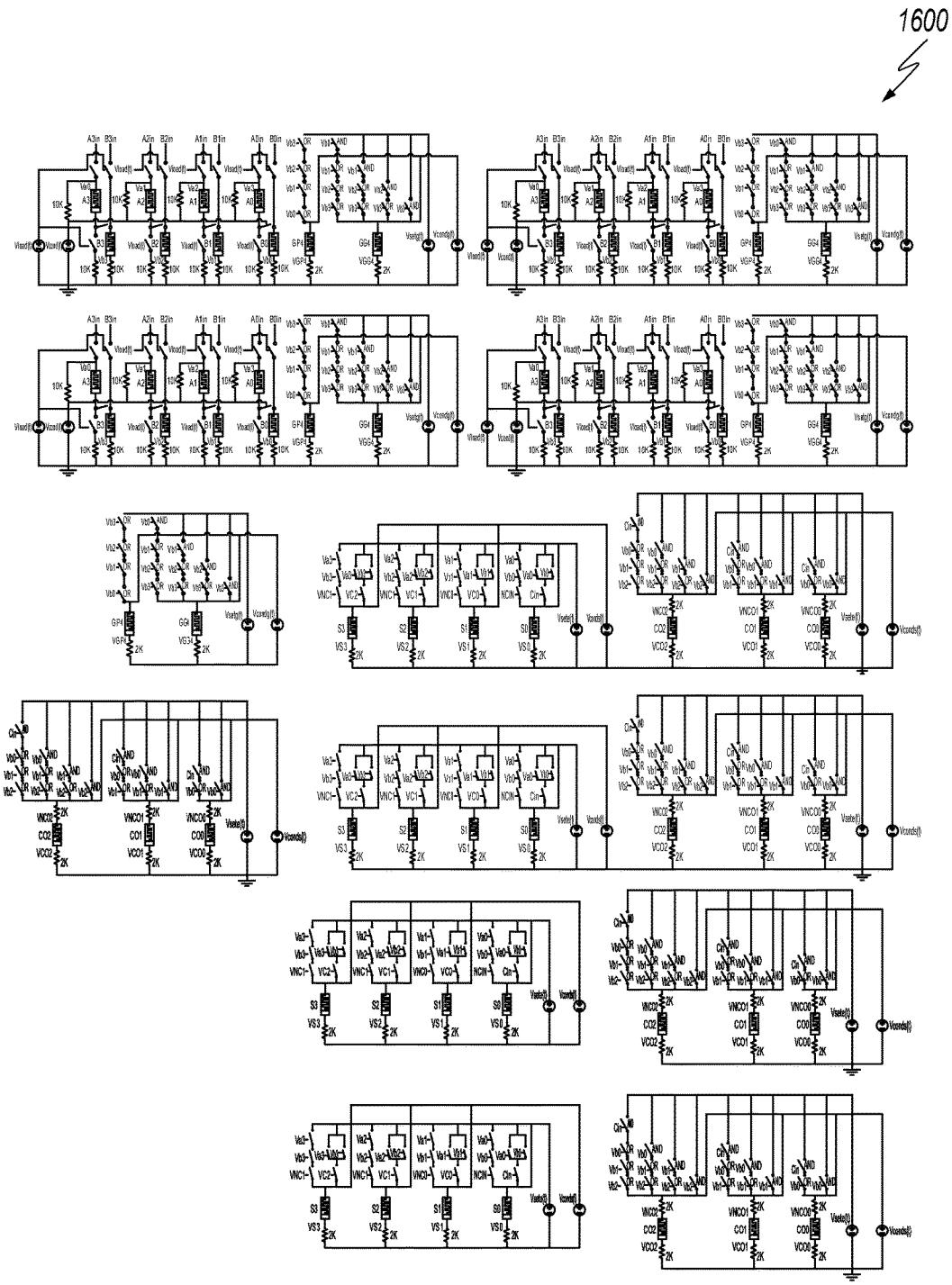
FIG. 16 illustrates a schematic for the 16-bit MAD carry lookahead adder in accordance with an embodiment of the present invention.

This process can be extended to implement a 16-bit adder. All of the 4-bit block output G and P signals are resolved in parallel in the first step of execution as described. Then, in the second step, the 16-bit GG and GP signals, the sum signals in the first 4-bit block, and the input carry signals for the other 4-bit blocks ($C4_{in}$, $C8_{in}$, and $C12_{in}$) can be resolved. The carry bits and group bits are resolved using the same circuitry as shown for the initial block but with the switch drivers modified to represent the respective inputs to the equation. In the third step, $C4_{in}$, $C8_{in}$, and $C12_{in}$ are passed into their respective blocks and the carry signals internal to these blocks are resolved. In the fourth and final step, all remaining sum signals for the 16-bit addition are resolved. The complete schematic for the 16-bit MAD carry lookahead adder 1600 is shown in FIG. 16 in accordance with an embodiment of the present invention.

Figure 17:
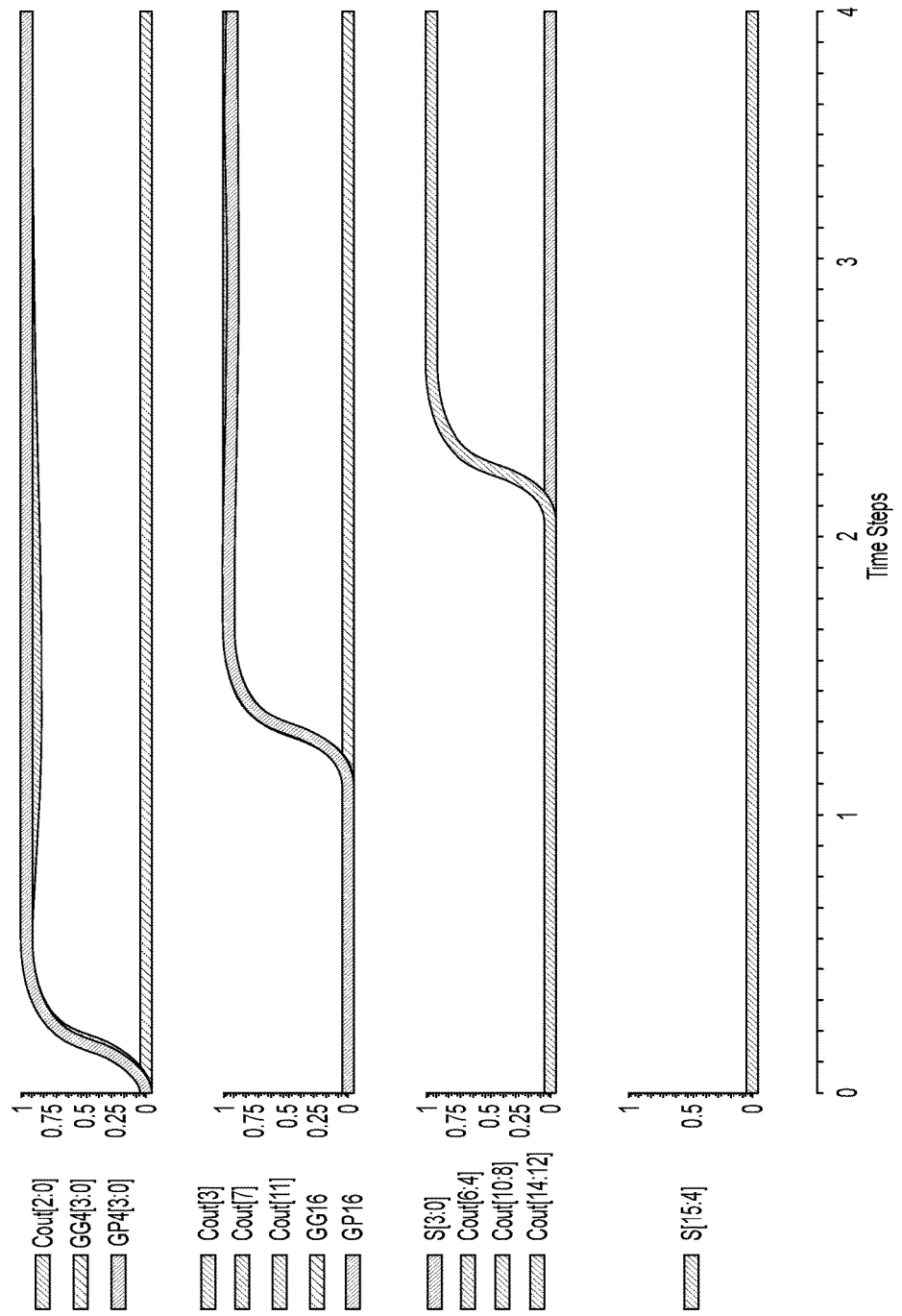
FIG. 17 depicts the 16-bit MAD carry lookahead adder execution for 0x0+0xFFFF in accordance with an embodiment of the present invention.

The total delay for a 16-bit carry lookahead addition is 4 steps. A waveform showing the adder's behavior for the addition 0x0+0xFFFF with $C_{in}=1$ across 4 steps is shown in FIG. 17, which depicts the 16-bit MAD carry lookahead adder execution for 0x0+0xFFFF in accordance with an embodiment of the present invention.

In the first step, the GG and GP bits for each block, and the internal carry signals in the first block, are resolved. The GG values all correctly resolve to 0 since all of the bits' ANDS fail, while all of the GP values resolve to 1 since all of the bits' ORs pass. In the second step, $C4_{in}$, $C8_{in}$, $C12_{in}$, and the 16-bit group propagate GP16 all resolve to 1 and GG16 resolves to 0 by sensing the GG4 and GP4 signals resolved in step 1. In step 3, all remaining carry signals resolve and in step 4, all remaining sum signals resolve.

In general, for an N-bit addition with block size=log(N) blocks, the MAD implementation takes log(N) steps. This is much faster than previous approaches. Also, the MAD design can be pipelined. Once the carry and sum signals have been resolved and propagated from the first 4-bit block, a new addition can begin. Thus, after the first two steps of execution, the block can be reset and loaded with the next inputs. The reset and load take two steps total so a block can begin a new addition every four steps.

As a result of employing MAD gates in memristor-based adders, the number of delay steps may be less than half than the number of delay steps required in traditional CMOS implementations of adders. Furthermore, by using MAD gates, memristor-based adders can be implemented with less complexity (e.g., fewer memristors and drivers). As a result, by the memristor-based adders using MAD gates, the speed and complexity of a wide variety of arithmetic operations is improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A ripple carry adder, comprising:
   a first memristor, wherein said first memristor is connected to a first switch and a second switch;
   a second memristor connected in parallel to said first memristor, wherein said second memristor is connected to a third switch, wherein a fourth switch is connected to said first and second memristors;
   a third memristor connected in parallel to said second memristor, wherein said third memristor is connected to a fifth switch;
   a fourth memristor connected in parallel to said third memristor, wherein said fourth memristor is connected to a sixth switch;
   a fifth memristor connected in parallel to said fourth memristor, wherein said fifth memristor is connected to a seventh and an eighth switch, wherein said seventh and eighth switches are connected in series;
   a sixth memristor connected in parallel to said fifth memristor, wherein said sixth memristor is connected to a ninth and a tenth switch, wherein said ninth and tenth switches are connected in parallel;
   a seventh memristor connected in parallel to said sixth memristor, wherein said seventh memristor is connected to a first power source; and
   an eighth memristor connected in parallel to said seventh memristor, wherein said eighth memristor is connected to said first power source.

2. The ripple carry adder as recited in claim 1, wherein said first memristor is connected to a second power source via a first resistor, wherein said third switch is connected to a third power source, wherein said fifth, sixth, seventh, ninth and tenth switches are connected to a fourth power source, and wherein said third, fourth, fifth and sixth memristors are connected to a fifth power source.

3. The ripple carry adder as recited in claim 1, wherein said first memristor is connected to a second power source via a first resistor, wherein said second switch is connected to ground via a second resistor, wherein said second memristor is connected to said ground via a third resistor, wherein said third memristor is connected to said ground via a fourth resistor, wherein said fourth memristor is connected to said ground via a fifth resistor, wherein said fifth memristor is connected to said ground via a sixth resistor, wherein said sixth memristor is connected to said ground via a seventh resistor, wherein said seventh memristor is connected to said ground via an eighth resistor, and wherein said eighth memristor is connected to said ground via a ninth resistor.

4. The ripple carry adder as recited in claim 1, wherein an eleventh switch and a twelfth switch are connected to said seventh memristor, wherein a thirteenth switch and a fourteenth switch are connected to said eighth memristor.

5. A ripple carry adder, comprising:
   a first memristor connected to a first power source, wherein said first memristor is connected to a first switch and a second switch;
   a second memristor connected in parallel to said first memristor, wherein said second memristor is connected to a third switch, wherein a second power source is connected to said third switch, wherein a fourth switch is connected to said first and second memristors;
   a third memristor connected in parallel to said second memristor, wherein said third memristor is connected to a fifth switch, a sixth switch and a seventh switch, wherein said sixth and seventh switches are connected in series, wherein said sixth and seventh switches are connected in parallel to said fifth switch; and
   a fourth memristor connected in parallel to said third memristor, wherein said fourth memristor is connected to an eighth switch, a ninth switch, a tenth switch, an eleventh switch, a twelfth switch and a thirteenth switch, wherein said eighth, ninth and tenth switches are connected in series, wherein said eleventh and twelfth switches are connected in parallel, wherein a combination of said eleventh and twelfth switches is connected in series with said thirteenth switch, wherein a combination of said eighth, ninth and tenth switches is connected in parallel to a combination of said eleventh, twelfth and thirteenth switches.

6. The ripple carry adder as recited in claim 5, wherein said first power source is connected to said first memristor via a first resistor, wherein said second switch is connected to ground via a second resistor, wherein said second memristor is connected to said ground via a third resistor, wherein said third memristor is connected to said ground via a fourth resistor, wherein said fourth memristor is connected to said ground via a fifth resistor.

7. The ripple carry adder as recited in claim 5, wherein a third power source is connected to said fifth, sixth, eighth, eleventh and twelfth switches, wherein a fourth power source is connected to said third memristor.

8. A carry select adder, comprising:
- a first memristor connected to a first power source, wherein said first memristor is connected to a first switch and a second switch;
- a second memristor connected in parallel to said first memristor, wherein said second memristor is connected to a third switch, wherein a second power source is connected to said third switch, wherein a fourth switch is connected to said first and second memristors;
- a third memristor connected in parallel to said second memristor, wherein said third memristor is connected to a fifth switch, a sixth switch and a seventh switch, wherein said sixth and seventh switches are connected in series, wherein said sixth and seventh switches are connected in parallel to said fifth switch;
- a fourth memristor connected in parallel to said third memristor, wherein said fourth memristor is connected to an eighth switch, a ninth switch, a tenth switch, an eleventh switch, a twelfth switch and a thirteenth switch, wherein said eighth, ninth and tenth switches are connected in series, wherein said eleventh and twelfth switches are connected in parallel, wherein a combination of said eleventh and twelfth switches is connected in series with said thirteenth switch, wherein a combination of said eighth, ninth and tenth switches is connected in parallel to a combination of said eleventh, twelfth and thirteenth switches;
- a fifth memristor connected in parallel to said fourth memristor, wherein said fifth memristor is connected to a fourteenth switch, a fifteenth switch and a sixteenth switch, wherein said fifteenth and sixteenth switches are connected in series, wherein said fifteenth and sixteenth switches are connected in parallel to said fourteenth switch; and
- a sixth memristor connected in parallel to said fifth memristor, wherein said sixth memristor is connected to a seventeenth switch, an eighteenth switch, a nineteenth switch, a twentieth switch, a twenty-first switch and a twenty-second switch, wherein said seventeenth, eighteenth and nineteenth switches are connected in series, wherein said twentieth and twenty-first switches are connected in parallel, wherein a combination of said twentieth and twenty-first switches is connected in series with said twenty-second switch, wherein a combination of said seventeenth, eighteenth and nineteenth switches is connected in parallel to a combination of said twentieth, twenty-first and twenty-second switches.

9. The carry select adder as recited in claim 8, wherein said first power source is connected to said first memristor via a first resistor, wherein said second switch is connected to ground via a second resistor, wherein said second memristor is connected to said ground via a third resistor, wherein said third memristor is connected to said ground via a fourth resistor, wherein said fourth memristor is connected to said ground via a fifth resistor, wherein said fifth memristor is connected to said ground via a sixth resistor, wherein said sixth memristor is connected to said ground via a seventh resistor.

10. The carry select adder as recited in claim 8, wherein a third power source is connected to said fifth, sixth, eighth, eleventh, twelfth, fourteenth, fifteenth, seventeenth, twentieth and twenty-first switches, wherein a fourth power source is connected to said third, fourth, fifth and sixth memristors.

\* \* \* \* \*